United States Patent
Takesue et al.

(10) Patent No.: US 10,733,488 B2
(45) Date of Patent: Aug. 4, 2020

(54) IMAGE PROCESSING APPARATUS, METHOD, AND PROGRAM PRODUCT CHANGING DOT PATTERN WHEN CONTACT STATE BETWEEN DOTS CHANGES DUE TO LANDED-DOT SHIFT

(71) Applicant: CANON KABUSHIKI KAISHA, Tokyo (JP)

(72) Inventors: Naoya Takesue, Tokyo (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/552,014

(22) Filed: Aug. 27, 2019

(65) Prior Publication Data

US 2020/0074251 A1  Mar. 5, 2020

(30) Foreign Application Priority Data

Aug. 31, 2018 (JP) ................................ 2018-163545

(51) Int. Cl.
  *G06K 15/02* (2006.01)
  *H04N 1/405* (2006.01)
  (Continued)

(52) U.S. Cl.
  CPC ......... *G06K 15/1881* (2013.01); *H04N 1/409* (2013.01); *H04N 1/4057* (2013.01);
  (Continued)

(58) Field of Classification Search
  CPC ............... H04N 1/034; H04N 1/40087; H04N 1/405–4058; H04N 1/52; H04N 1/56;
  (Continued)

(56) References Cited

U.S. PATENT DOCUMENTS 6,464,319 B1 * 10/2002 Teshigawara .......... B41J 2/2135
  347/19
8,540,332 B2 * 9/2013 Shibata ................ B41J 2/04508
  347/15
(Continued)

FOREIGN PATENT DOCUMENTS

JP   2004001311 A   1/2004
JP   2016064633 A   4/2016

*Primary Examiner* — Scott A Rogers
(74) *Attorney, Agent, or Firm* — Carter, DeLuca & Farrell LLP

(57) ABSTRACT

To generate a dot pattern whose deterioration of a feeling of granularity, density unevenness, and streaks are unlikely to be recognized visually by more effectively suppressing a change of an overlap of ink droplets on a printing medium. Halftone image data representing a dot pattern of each of two or more kinds of dot different in density reproduction is acquired. Then, in a case where there is a possibility that the contact state between dots changes due to a landed-dot shift of ink in a plurality of specific dots on a condition that dots are formed in accordance with a dot pattern in the halftone image data, the plurality of specific dots is replaced with dots of another kind whose number is less than or equal to that of the plurality of specific dots.

19 Claims, 18 Drawing Sheets

(51) Int. Cl.
*H04N 1/409* (2006.01)
*H04N 1/034* (2006.01)
*H04N 1/52* (2006.01)
*B41J 2/205* (2006.01)
*B41J 2/21* (2006.01)

(52) U.S. Cl.
CPC ............ *B41J 2/2054* (2013.01); *B41J 2/2121* (2013.01); *G06K 2215/101* (2013.01); *H04N 1/034* (2013.01); *H04N 1/52* (2013.01)

(58) Field of Classification Search
CPC .......... H04N 1/58; H04N 1/60; H04N 1/6027; B41J 2/205–2146; B41J 2/52; B41J 2/525; G06K 15/102; G06K 15/105; G06K 15/107; G06K 15/1876; G06K 15/1877; G06K 15/1878; G06K 15/188; G06K 15/1881
See application file for complete search history.

(56) References Cited

U.S. PATENT DOCUMENTS

| | | | |
|---|---|---|---|
| 8,605,330 B2* | 12/2013 | Fujita | B41J 2/2121 347/14 |
| 9,462,091 B2 | 10/2016 | Hara et al. | |
| 9,485,388 B2 | 11/2016 | Kodama et al. | |
| 9,734,439 B2 | 8/2017 | Hara et al. | |
| 9,749,496 B2 | 8/2017 | Fujimoto et al. | |
| 10,027,848 B2 | 7/2018 | Fuse et al. | |
| 10,043,118 B2 | 8/2018 | Sumi et al. | |
| 10,057,459 B2 | 8/2018 | Yamamoto et al. | |
| 10,063,743 B2 | 8/2018 | Fuse et al. | |
| 10,073,370 B2 | 9/2018 | Takikawa et al. | |
| 10,187,553 B2 | 1/2019 | Takesue et al. | |
| 10,194,053 B2 | 1/2019 | Otani et al. | |
| 10,205,854 B2 | 2/2019 | Shimada et al. | |
| 10,356,282 B2 | 7/2019 | Ochiai et al. | |
| 2017/0139363 A1 | 5/2017 | Takikawa et al. | |
| 2019/0156164 A1 | 5/2019 | Yanai et al. | |
| 2020/0079102 A1* | 3/2020 | Ochiai | B41J 2/2054 |

* cited by examiner

| PIXEL VALUE OF INK VALUE IMAGE DATA | LARGE DOT SIZE | MEDIUM DOT SIZE | SMALL DOT SIZE |
|---|---|---|---|
| 0 | 0 | 0 | 0 |
| 1 | 0 | 0 | 14 |
| 2 | 0 | 0 | 28 |
| ⋮ | ⋮ | ⋮ | ⋮ |
| 254 | 150 | 20 | 0 |
| 255 | 180 | 0 | 0 |

FIG.2

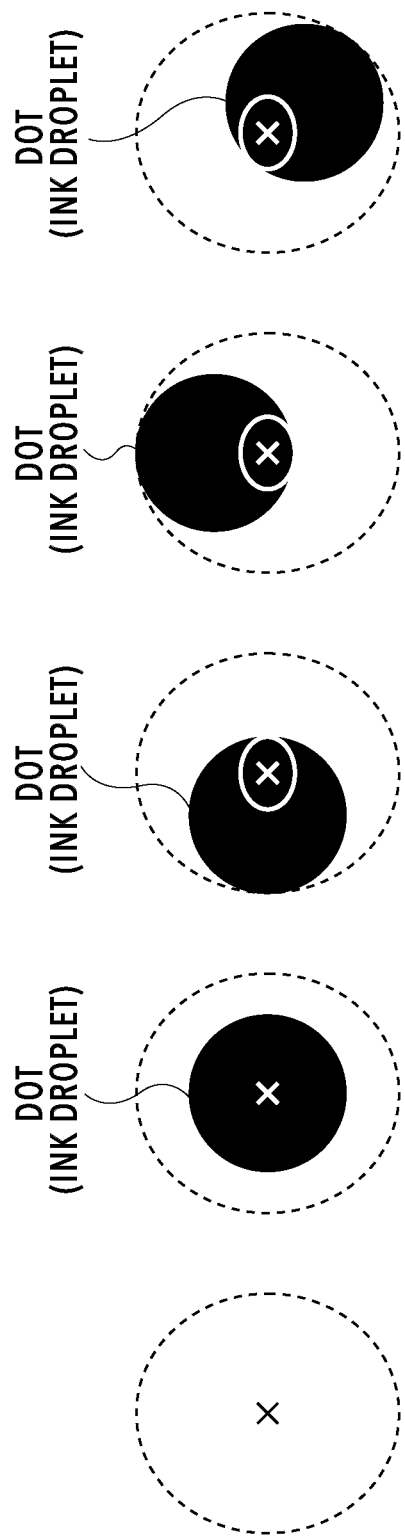

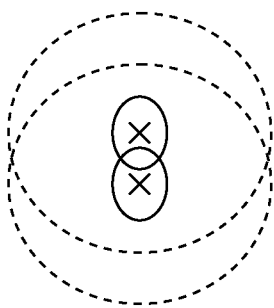
FIG.6C THERE IS NOT A POSSIBILITY THAT THE CONTACT STATE CHANGES
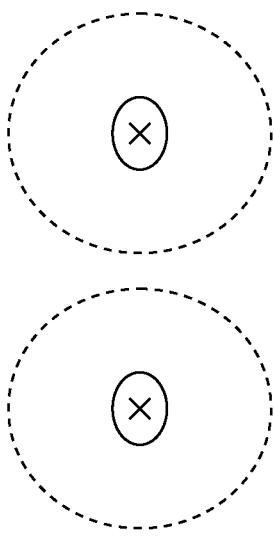
FIG.6B THERE IS NOT A POSSIBILITY THAT THE CONTACT STATE CHANGES
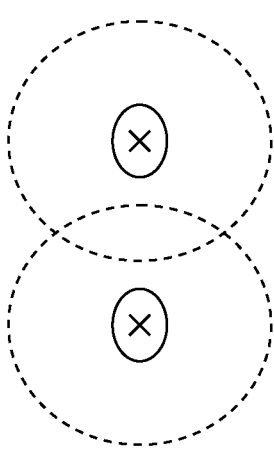
FIG.6A THERE IS A POSSIBILITY THAT THE CONTACT STATE CHANGES

| INPUT IMAGE DATA | CORRECTED IMAGE DATA |
|:---:|:---:|
| 0 | 0 |
| 1 | 1 |
| ⋮ | ⋮ |
| 127 | 117 |
| 128 | 118 |
| ⋮ | ⋮ |
| 255 | 255 |

FIG.15

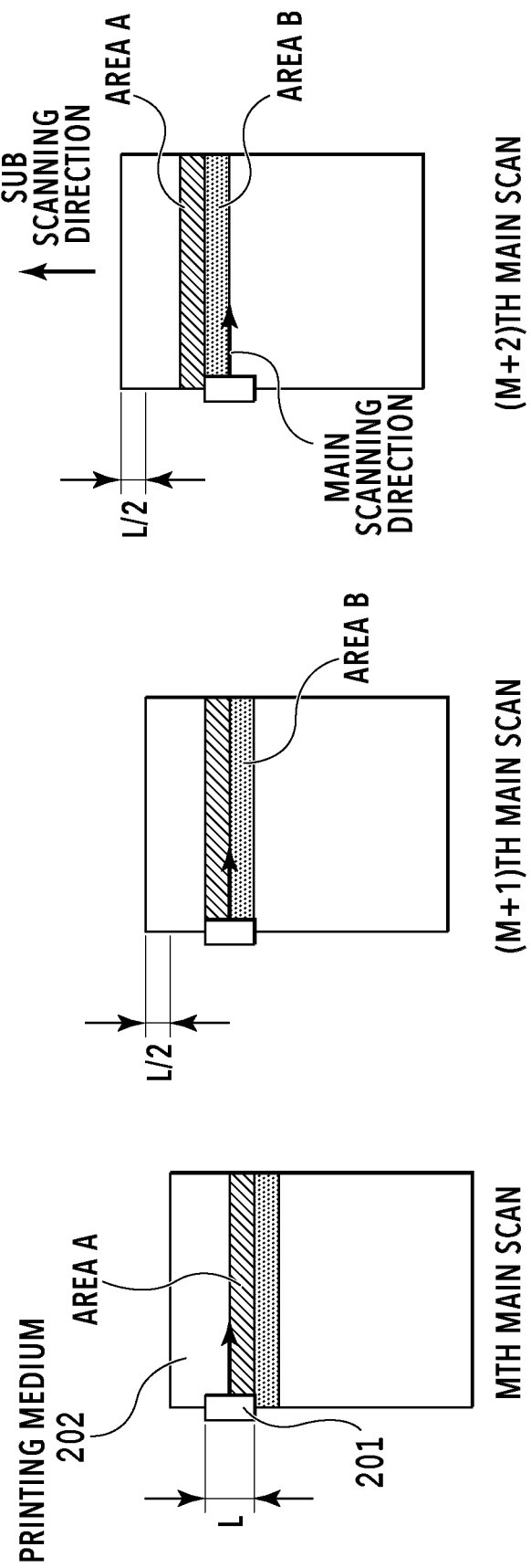

IMAGE PROCESSING APPARATUS, METHOD, AND PROGRAM PRODUCT CHANGING DOT PATTERN WHEN CONTACT STATE BETWEEN DOTS CHANGES DUE TO LANDED-DOT SHIFT

BACKGROUND OF THE INVENTION

Field of the Invention

The present invention relates to an image processing technique for forming an image on a printing medium by using ink droplets of different sizes or different densities.

Description of the Related Art

As an apparatus that outputs images, such as an image processed by a personal computer and an image captured by a digital camera or the like, an image forming apparatus is used frequently, which forms an image by fixing dots on a printing medium, such as paper. Among such image forming apparatuses, an ink jet printing method that forms an image on a printing medium by ejecting ink droplets from a plurality of printing elements and causing the ink droplets to stick thereto is widely put to practical use. The ink jet printing method is roughly divided into a multi-pass method and a full line method according to the configuration of a print head. In the multi-pass method, an image is formed by repeatedly performing the operation to cause a print head including nozzle columns to relatively perform a main scan for a printing medium and to convey the printing medium by a conveyance amount less than or equal to the length of the nozzle column in a sub scanning direction substantially perpendicular to the main scanning direction. In the full line method, an image is formed by relatively performing a scan for a printing medium by using a print head including nozzle columns whose length coves the width of the printing medium.

In an actual image forming apparatus, for example, a variation in the conveyance amount of a printing medium and a variation in physical registration, such as ink ejection direction displacement, occur inevitably. Consequently, it is also inevitable that the ink landing position shifts with respect to the target position. Such a shift in the ink landing position causes degradation of image quality, such as density unevenness and deterioration of a feeling of granularity in the multi-pass method and density unevenness in the form of streak in the full line method.

Regarding this point, Japanese Patent Laid-Open No. 2016-64633 has described a technique to generate halftone (HT) parameters that cause dot movement and a change of the contact state of dots to be as small as possible. At this time, from the "contact state of dots in dot arrangement including no error" and the "contact state of dots in dot arrangement including errors", a change in influence of dot movement is evaluated quantitatively. Further, Japanese Patent Laid-Open No. 2004-1311 has described a technique to reduce the feeling of granularity of dots, unevenness, and streaks by extracting a dot aggregation portion where n dots aggregate on binary image data and converting the extracted dot aggregation portion with a larger size dot.

However, the suppression effect of a change of the contact state of ink droplets on a printing medium is not sufficient with the techniques described in the above documents.

For example, even though the HT parameters are optimized by the technique described in Japanese Patent Laid-Open No. 2016-64633, the arrangement of ink dots actually ejected is determined by the HT parameters and an input image, and therefore, there is a case where the change of the contact state of dots is not suppressed depending on the input image. Further, in the medium to high density portion where the number of dots per unit area increases, in a case where the HT parameters that suppress the change of the dot contact state are used, there is a possibility that texture is conspicuous and image quality degrades.

Further, in a case of the technique described in Japanese Patent Laid-Open No. 2004-1311, for dots adjacent to each other on a binary image, the possibility that the contact state between dots changes due to an error is faint on a condition that the diameters thereof are small and the dots are sufficiently apart from each other for the error on a printing medium. Because of this, the possibility that degradation of image quality, such as deterioration of the feeling of granularity and occurrence of density unevenness and streaks, occurs is faint. Similarly, also in a case where an overlap of dots on a printing medium is sufficiently large for the error, the possibility that the overlap of dots changes due to the error is faint and the possibility of degradation of the feeling of granularity and occurrence of density unevenness and streaks is faint. On the other hand, even though dots are separate on a binary image, in a case where a landed-dot shift is large and the overlap of dots changes, it can be said that the possibility of degradation of the feeling of granularity and occurrence of unevenness and streaks is strong. That is, in the technique described in Japanese Patent Laid-Open No. 2004-1311, a dot aggregation portion is extracted on a binary image, and therefore, there is a case where degradation of the feeling of granularity and occurrence of unevenness and streaks cannot be suppressed because it is not possible to take into consideration the contact state change on a printing medium due to the dot diameter and the landed-dot shift amount. Alternatively, there is a case where granularity and resolution are lost because conversion into a large size is performed even though the possibility that the overlap of dots changes due to an error is faint.

SUMMARY OF THE INVENTION

The image processing apparatus according to the present disclosure is an image processing apparatus for performing image formation by forming dots on a printing medium by ejecting ink and includes: an acquisition unit configured to acquire halftone image data representing a dot pattern of each of two or more kinds of dot different in density reproduction; and a dot rearrangement unit configured to change, in a case where there is a possibility that a contact state between dots changes due to a landed-dot shift of the ink in a plurality of specific dots on a condition that dots are formed in accordance with a dot pattern in the halftone image data, the dot pattern by replacing the plurality of specific dots with dots of another kind whose number is less than or equal to that of the plurality of specific dots.

Further features of the present invention will become apparent from the following description of exemplary embodiments with reference to the attached drawings.

BRIEF DESCRIPTION OF THE DRAWINGS

FIG. 2 is a diagram showing an example of a dot size separation LUT;

FIG. 5A to FIG. 5E are diagrams explaining a landed-dot shift characteristic;

FIG. 6A to FIG. 6C are diagrams explaining a possibility of a change of a contact state of dots;

FIG. 9A to FIG. 9E are each a diagram showing an example of a binary image;

FIG. 15 is a diagram showing an example of a color material amount correction LUT;

FIG. 18A to FIG. 18C are a diagrams explaining a two-pass printing operation.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment (System Configuration)

Figure 1:
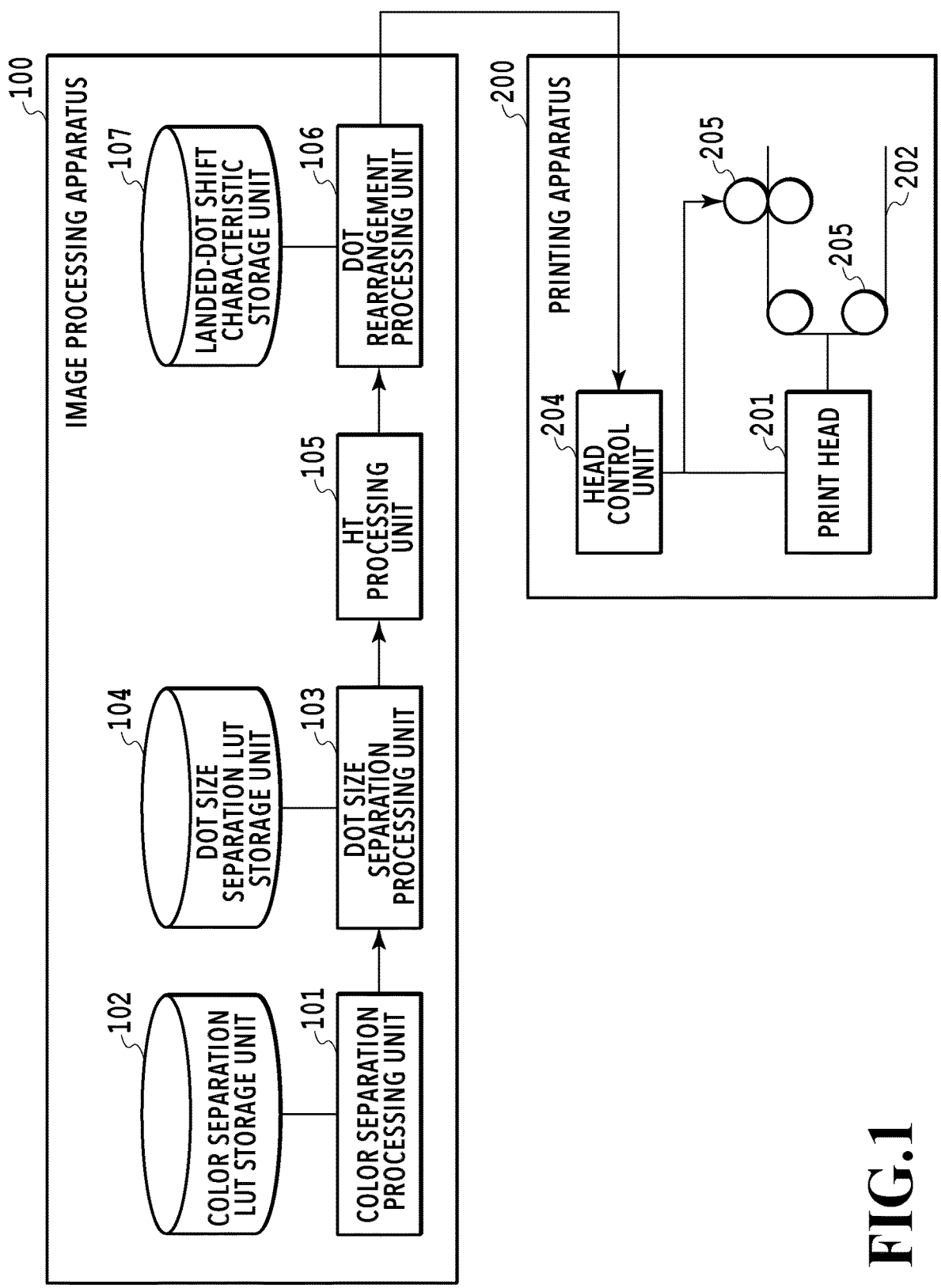
FIG. 1 is a block diagram showing an example of a configuration of an image forming system according to a first embodiment.

FIG. 1 is a block diagram showing an example of a configuration of an image forming system according to the present embodiment. The image forming system shown in FIG. 1 includes an image processing apparatus 100 and a printing apparatus 200 and both are connected to each other by an interface or a circuit. The image processing apparatus 100 includes a color separation processing unit 101, a color separation LUT storage unit 102, a dot size separation processing unit 103, a dot size separation LUT storage unit 104, an HT processing unit 105, a dot rearrangement processing unit 106, and a landed-dot shift characteristic storage unit 107. The image processing apparatus 100 is, for example, a general personal computer (PC) and includes a CPU, a RAM, a ROM, an HDD, and the like and each of the above-described units 101 to 107 is implemented by a printer driver installed in the PC. In the present embodiment, the image processing apparatus 100 is configured as an apparatus independent of the printing apparatus, but a configuration may also be accepted in which the printing apparatus 200 also has the function of the image processing apparatus 100.

(Configuration of Image Processing Apparatus)

Printing-target color image data (hereinafter, described as "input color image data") that is input to the image processing apparatus 100 is stored in an input image buffer, not shown schematically, and then sent to the color separation processing unit 101. It is assumed that each pixel of the input color image data of the present embodiment has pixel values representing each of three color components red (R), green (G), and blue (B) by 256 tones (eight bits) of 0 to 255.

The color separation processing unit 101 performs color separation processing for input color image data and converts into image data in accordance with colors of color materials included in the printing apparatus 200. In the present embodiment, it is assumed that input color image data is separated into image data (hereinafter, "ink value image data") in which each pixel has a multi-value (8-bit) pixel value in accordance with four kinds of ink, that is, cyan (C), magenta (M), yellow (Y), and black (K). It may be possible to apply a publicly known method to the color separation processing and for example, the input color image data is converted into ink value image data by referring to a color separation lookup table (LUT) stored in the color separation LUT storage unit 102. The ink value image data obtained by the color separation processing is sent to the dot size separation processing unit 103. In a case of a configuration in which image data in which the color of each pixel is represented by CMYK color components is input directly as the input color image data, it may be possible to skip the color separation processing unit 101.

The dot size separation processing unit 103 separates the ink value image data into multi-value image data in accordance with two or more different dot sizes. For example, in a case where there are three kinds of dot size (large, medium, small), the ink value image data is separated into image data for each "ink color+dot size" of 12 kinds (C large, C medium, C small, M large, . . . , K small) corresponding to combinations of each color of CMYK and each dot size. Here, for example, "C large" means image data of a large cyan dot, "C medium" means image data of a medium cyan dot, and "C small" means image data of a small cyan dot, and this is also true with the other colors. Separation of the ink value image data into the image data for each "ink color+dot size" is performed by referring to a dot size separation LUT stored in the dot size separation LUT storage unit 104. FIG. 2 is an example of the dot size separation LUT. It may also be possible to prepare one LUT such as this and apply to CMYK in common or to prepare an LUT different for each ink color. For example, it is assumed that the value of a pixel at position coordinates (x, y) in the ink value image data is "254". In a case where the LUT in FIG. 2 is used, the value of the pixel at the position coordinates (x, y) in the image data corresponding to a large dot is "150". Similarly, the value of the pixel at the position coordinates (x, y) in the image data corresponding to a medium dot is "20" and the value of the pixel at the position coordinates (x, y) in the image data corresponding to a small dot is "0". It may also be possible to perform the color separation processing and the dot size separation processing at the same time. In this case, it is possible to perform the processing at the same time by preparing and storing an "ink color+dot size separation LUT" in which each of RGB values of input color image data and the value of the above-described 12 kinds corresponding to the combinations of each color of CMYK and the dot size and by referring to the LUT. The plurality (=product of the number of ink colors and the number of dot sizes) of pieces of image data thus obtained for each "ink color+dot size" is sent to the HT processing unit 105.

The HT processing unit 105 converts the image data for each "ink color+dot size" in which each pixel value is represented by a multi-value (eight bits) into halftone image data (hereinafter, binary image data) in which formation of a dot is represented by a binary value of on (1) and off "0". As the conversion processing (halftone processing) into binary image data in the HT processing unit 105, it may be possible to use a publicly known method, such as an ordered dither method and an error diffusion method. The binary image data obtained by the halftone processing is sent to the dot rearrangement processing unit 106.

The dot rearrangement processing unit 106 performs dot rearrangement by referring to the landed-dot shift characteristic data stored in the landed-dot shift characteristic storage unit 107 and changing a part of on and off of dot formation (dot pattern) represented by the binary image data, which is output results from the HT processing unit 105. Specifically, the dot rearrangement processing unit 106 performs processing to replace two dots having a possibility that the contact state of the dots changes (from contact to noncontact, or from noncontact to contact) with one larger size dot. At this time, a list in which combinations of two dots having a possibility that the two dots contact each other (hereinafter, called "dot pair") are extracted in the binary image data is created and stored in advance and two dots having a possibility that the contact state changes is specified by referring to the list. To create the list, for example, it is sufficient to extract two dots whose ink ejection positions are adjacent to each other in the binary image as the above-described "dot pair" and list the dot pair. Then, whether or not each dot pair described in the list has a possibility that the contact state of the dots configuring the dot pair changes (from contact to noncontact, or from noncontact to contact) is determined.

Figure 3C:
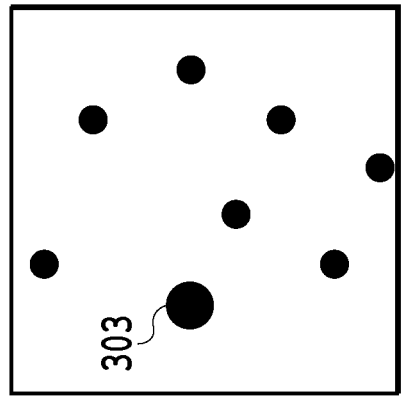
FIG. 3A to FIG. 3C are diagrams explaining dot rearrangement processing.
Figure 3B:
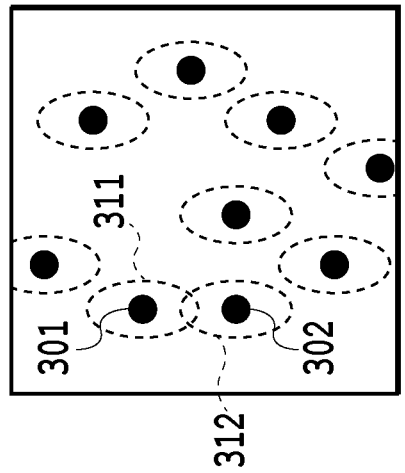
Figure 3A:
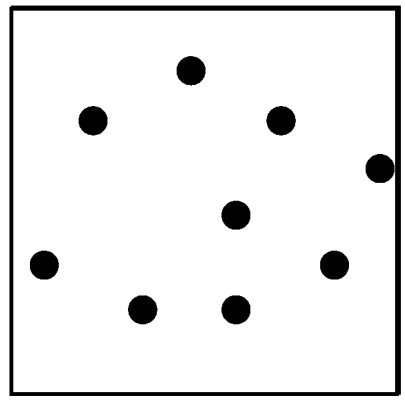

Here, by using specific examples in FIG. 3A to FIG. 3C, the dot rearrangement processing is explained. FIG. 3A shows a dot pattern of small dots converted into binary values in the HT processing unit 105. The black circle in FIG. 3A indicates a small dot formed by ink ejection. FIG. 3B is a diagram showing an ink landing predicted range that is calculated based on the landed-dot shift characteristic data for each small dot in FIG. 3A by a dotted line, and the ink landing predicted range of an ink droplet forming each small dots is in the shape of an ellipse elongated vertically. In FIG. 3B, the dotted line range in the shape of an ellipse enclosing each small dot indicates a range having a possibility that an ink droplet sticks. FIG. 3C is a dot pattern after the pair of small dots having a possibility that the contact state of the dots changes due to the landed-dot shift is replaced en bloc with one medium dot based on the ink landing predicted range shown in FIG. 3B. In FIG. 3B, it is known that an ink landing predicted range 311 of a small dot 301 and an ink landing predicted range 312 of a small dot 302 overlap in part. Consequently, these two small dots 301 and 302 are regarded as having a possibility that the contact state changes from noncontact to contact, and therefore, the two small dots 301 and 302 are replaced with a one-size larger medium dot 303. Details of the landed-dot shift characteristic data and the dot rearrangement processing will be described later. The binary image data after the dot rearrangement processing is stored in a print image storage buffer, not shown schematically, and output to the printing apparatus 200 as print image data.

(Configuration of Printing Apparatus)

Figure 4:
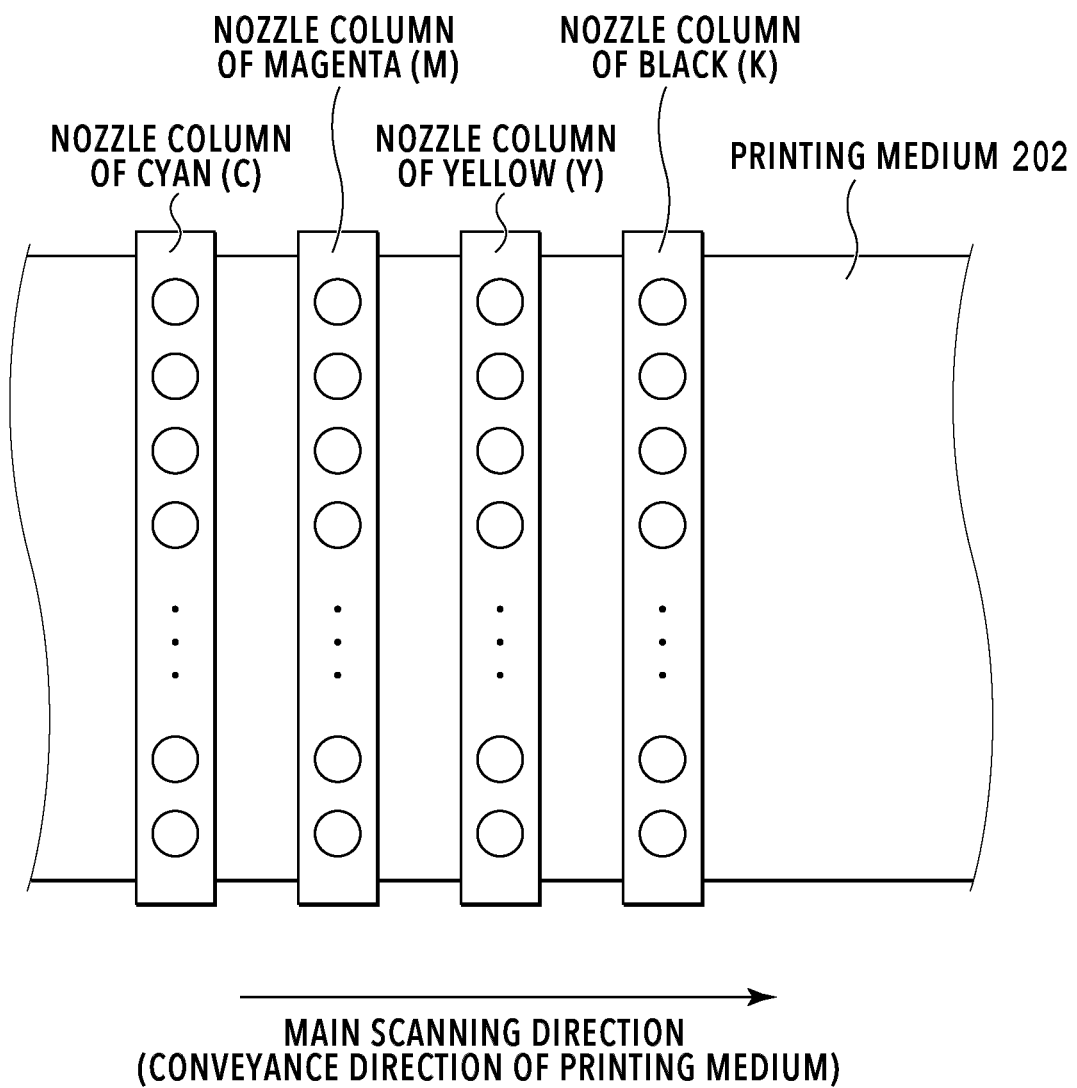
FIG. 4 is a diagram showing an example of a configuration of a print head.

Next, the configuration of the printing apparatus 200 is explained. In the present embodiment, it is assumed that the printing apparatus 200 is a full line method ink jet printing apparatus. The printing apparatus 200 forms an image on a printing medium by relatively moving a printing medium, such as paper, for a print head 201 and ejecting ink of each color based on print image data received from the image processing apparatus 100. FIG. 4 is a diagram showing an example of the configuration of the print head 201. As shown in FIG. 4, the print head 201 of the present embodiment has one nozzle column corresponding to each ink of CMYK, which covers the entire area in the width direction of a printing medium 202. Each nozzle column includes an ejection port (nozzle) capable of ejecting ink of the same color and the same density in a plurality of sizes (large, medium, small). Further, each nozzle column is installed at regular intervals in the conveyance direction of the printing medium 202 and by superimposing the image formed by the ink ejected from each nozzle column, a final full color image is obtained. At this time, a head control unit 204 generates a drive signal for controlling the print head 201 based on the print image data. The print head 201 forms an image by ejecting each ink onto the printing medium 202 while adjusting the dot size based on the drive signal corresponding to each nozzle column. At this time, the printing medium 202 is conveyed in the main scanning direction at a constant speed by a conveyance unit 205.

(Dot Size)

As described above, each nozzle column configuring the print head 201 of the present embodiment is capable of ejecting an ink droplet corresponding to three kinds of size, that is, large, medium, and small. Generally, in a print head capable of forming dots of a plurality of sizes, it is desirable for a large dot to form a dot diameter sufficient to cover the paper surface sufficiently in a dark area. To that end, it is sufficient to set the ink ejection amount so that the dot diameter is sufficient to cover the diagonal line of a grid partitioned by at least the output resolution. For example, it is preferable for the diameter of a large size dot to be designed so as to be larger than at least 60 µm in a case where the output resolution is 600 dpi.

On the other hand, a small dot is formed as an isolated point in a highlight area, and therefore, the smaller the dot diameter is, the more the feeling of granularity of a bright portion is suppressed. However, in a case where the ink ejection amount is reduced in order to reduce the dot diameter, the possibility that ink is not formed as a liquid droplet and ink does not stick to the paper surface becomes strong. Because of this, generally, in many cases, the dot diameter is designed so as to form a dot diameter of about 10 to 30 µm although this differs largely depending on the configuration of the print head and the printing medium.

Further, by setting the dot diameter of a medium dot to a dot diameter between that of a small dot and that of a large dot, it is possible to suppress the feeling of granularity resulting from the difference in size in a case where large, medium, and small dots exist in a mixed manner. Alternatively, there are many cases where the dot diameter is designed by setting the dot diameter of a medium dot to a dot diameter sufficient to cover the diagonal line of a grid (in a case where the output resolution is 600 dpi, 60 µm) and setting the dot diameter of a large dot to a diameter 1.5 times the grid width. For example, it may also be possible to design the dot diameter so that the diameter of a large size dot is larger than at least 65 µm in a case where the output resolution is 600 dpi. By designing the dot diameter as described above, even in a case where a certain nozzle ejects ink no longer, it is possible to make a white spot less conspicuous by the adjacent nozzle and suppress the portion where there is no ejection from being perceived as a bright line.

(Landed-Dot Shift Characteristic)

Following the above, the landed-dot shift characteristic data that is referred to in the dot rearrangement processing is explained. The landed-dot shift characteristic data is data indicating how much the position at which the ink lands actually shifts from the ink ejection target-position (shift amount from the target). By the landed-dot shift characteristic, information of 1) to 3) below is known.

1) a range having a possibility that ink sticks being expected to be sufficiently faint (ink non-sticking range)

2) a range having a possibility that ink sticks being expected to be sufficiently strong (ink sticking range)

3) a range having both a possibility that ink sticks and a possibility that ink does not stick being expected to a certain extent (ink sticking instable range)

FIG. 5A to FIG. 5E are explanatory diagrams of the landed-dot shift characteristic. In FIG. 5A to FIG. 5E, a x mark indicates the ink ejection target-position. The ink ejection target-position represents the center position at which a dot is formed in a case where the landed-dot shift does not occur and in a case where the landed-dot shift does not occur actually, as shown in FIG. 5B, a dot (ink droplet) is formed with the x mark as a center. A dotted line circle in FIG. 5A to FIG. 5E indicates the boundary of the above-described "ink non-sticking range". That is, in a case where the amount of the landed-dot shift supposed at the time of taking the above-described x mark to be the ejection target-position is taken into consideration, there is a possibility, if any, that ink sticks within the range inside the circle. FIG. 5C to FIG. 5E show variations in a case where the ink landing position shifts from the ejection target-position (x mark). Then, an ellipse drawn by a solid-white line in FIG. 5C to FIG. 5E indicates the boundary of the above-described "ink sticking range". That is, the ellipse indicates that the possibility that ink sticks to within the range inside the ellipse is sufficiently strong even though the ink landing position shifts from the ejection target. Then, the area between the dotted line circle and the solid-white line ellipse is the range in which ink sticks or does not stick depending on the amount and direction of the landed-dot shift (range having both a possibility that ink sticks and a possibility that ink does not stick and both change respectively) and indicates the above-described "ink sticking instable range".

In the present embodiment, first, from the binary image obtained by the HT processing unit 105, the dot ejection target-position (the x mark in FIG. 5A to FIG. 5E) is specified. Then, by further specifying the "ink non-sticking range", the "ink sticking range", and the "ink sticking instable range", whether or not the contact state changes is determined. Here, with reference to FIG. 6A to FIG. 6C, a specific determination method is explained. First, as shown in FIG. 6A, in a case where the "image sticking instable ranges" indicated by the dotted line circles overlap but the "ink sticking ranges" indicated by the solid line ellipses do not overlap, it is determined that there is a possibility that the contact state changes due to a landed-dot shift. Next, as shown in FIG. 6B, in a case where the "image sticking instable ranges" indicated by the dotted line circles do not overlap and the "ink sticking ranges" indicated by the solid line ellipses also do not overlap, it is determined that there is not a possibility that the ranges contact each other irrespective of a landed-dot shift and there is not a possibility that the contact state changes. Then, as shown in FIG. 6C, in a case where the "image sticking ranges" indicated by the solid line ellipses overlap, it is determined that there is not a possibility that the contact state changes because the contact will continue irrespective of a landed-dot shift.

Figure 7C:
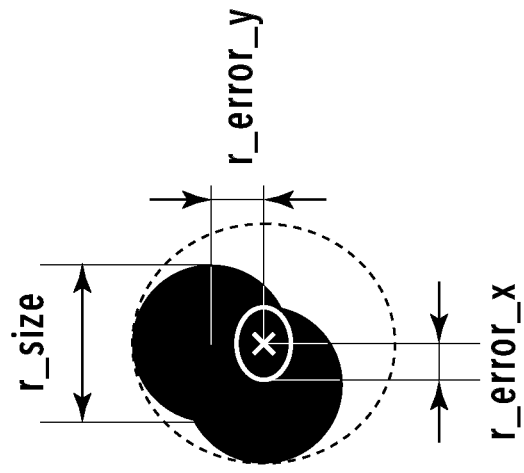
FIG. 7A to FIG. 7C are diagrams explaining a storage method of landed-dot shift characteristic data.
Figure 7B:
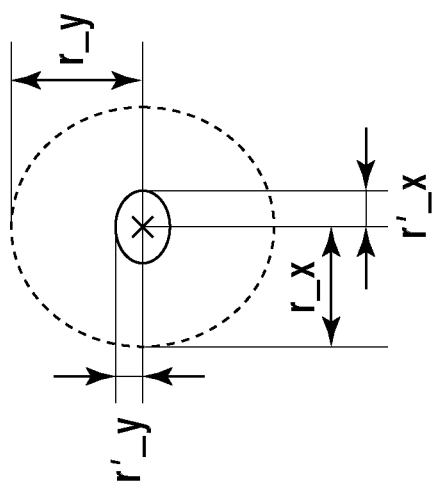
Figure 7A:
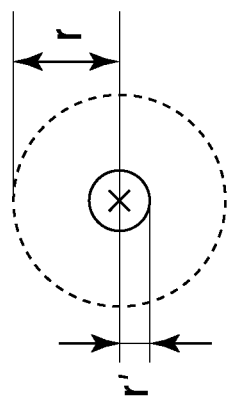

The above-described landed-dot shift characteristic is stored for each dot size, for example, as a function representing the shapes of the dotted line circle and the solid line ellipse described above. In general, it is known that the smaller the dot, the larger the landed-dot shift is and the larger the dot, the smaller the landed-dot shift is. In the common ink jet printing apparatus in recent years, in many cases, even the landed-dot shift of a small dot is suppressed to about several micrometers. In the present embodiment, the function representing the dotted line and the solid line shapes for each of the large, medium, and small dot sizes, which takes into consideration these points, is stored. Further, in a case where it is predicted that the landed-dot shift occurs isotropically, it is sufficient to store information on a radius r of a true circle indicated by a dotted line and a radius r' of a true circle indicated by a solid line as the landed-dot shift characteristic data as shown in FIG. 7A. Furthermore, in a case where it is possible to approximate the landed-dot shift range as an ellipse, it is sufficient to store information on lengths r_x and r'_x of the axes in the x-direction and lengths r_y and r'_y of the axes in the y-direction of the ellipses shown by a dotted line and a solid line, respectively, as the landed-dot shift characteristic data as shown in FIG. 7B. Still furthermore, it may also be possible to store information on a dot size r_size, a maximum landed-dot shift amount r_error_x in the horizontal direction, and a maximum landed-dot shift amount r_error_y in the vertical direction of dots as the landed-dot shift characteristic data as shown in FIG. 7C. The maximum landed-dot shift amount differs depending on the conveyance speed of a printing medium, the moving speed of the print head, and the like. For example, in a case of a printer whose resolution is 600 dpi, the distance between the centers of nozzles is about 20 µm. In this case, on a condition that an error of 20 µm or more occurs, it becomes difficult to reproduce a 600 dpi-input image, and therefore, it is preferable to suppress the maximum error at least to 20 µm or less. In a case where the maximum landed-dot shift amount is stored as the landed-dot shift characteristic data, it is sufficient to calculate r_x, r'_x, r_y, and r'y in accordance with equations (1a) to (1d) below.

$$r\_x = r\_size/2 + r\_error\_x \qquad \text{equation (1a)}$$

$$r'\_x = r\_size/2 - r\_error\_x \qquad \text{equation (1b)}$$

$$r\_y = r\_size/2 + r\_error\_y \qquad \text{equation (1c)}$$

$$r'\_y = r\_size/2 - r\_error\_y \qquad \text{equation (1d)}$$

Here, in equation (1b) described above, in a case where r'_x<0, it is assumed that r'_x=0 and in equation (1d) described above, in a case where r'_y<0, it is assumed that r'_y=0.

In a case where the landed-dot shift characteristic is specified by a length as described above, it may also be possible to use the number of pixels on an image with a predetermined resolution for representation, in addition to a case where a real number, such as millimeter or inch, is used. However, in a case where the number of pixels is used, it is favorable to adopt the number of pixels with a resolution higher than the resolution at the time of halftone processing. For example, in a case where the resolution at the time of halftone processing is 1,200 dpi, the number of pixels in units of 4,800 dpi or 9,600 dpi is used, and so on.

(Dot Rearrangement Processing)

Figure 8:
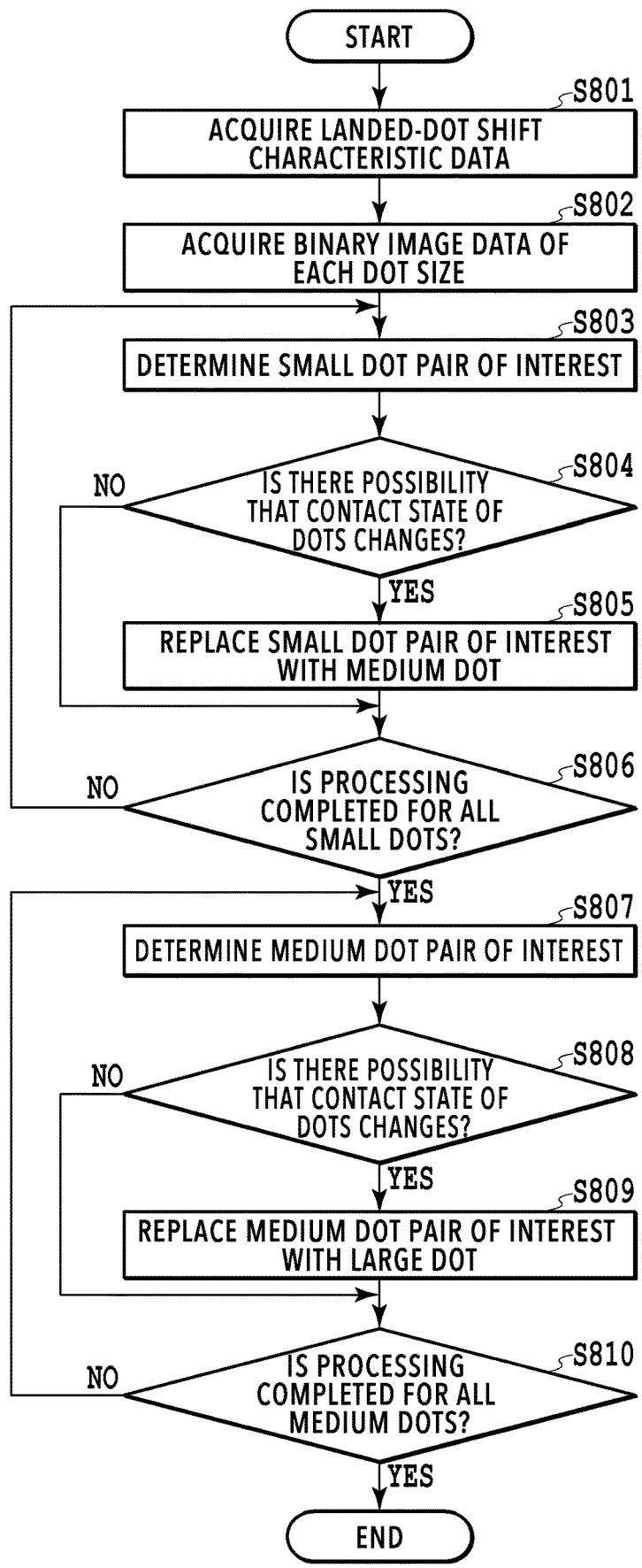
FIG. 8 is a flowchart showing a flow of dot rearrangement processing according to the first embodiment.

Following the above, the dot rearrangement processing in the dot rearrangement processing unit 106 is explained. FIG. 8 is a flowchart showing a flow of the dot rearrangement processing to replace a dot pair that satisfies a predetermined condition with a one larger dot according to the present embodiment. In a case of the present embodiment that premises the existence of the three kinds of dot size, that is, large, medium, and small, the flowchart is a flow including loop processing to replace a small dot pair with a medium dot and loop processing to replace a medium dot pair with a large dot. That is, the number of pieces of loop processing in the flow of the present embodiment depends on the number of kinds of dot size and in a case where there are two kinds of dot size, there is one loop of replacement processing and in a case where there are four kinds of dot size, there are three loops of replacement processing. Further, the flow shown in FIG. 8 is performed for each ink color (here, CMYK). In the following, explanation is given by taking processing for K (black) as an example, but in the actual processing, the flow in FIG. 8 is repeated for each color of CMYK. Symbols "S" at top of each piece of processing means a step.

First, at S801, the landed-dot shift characteristic data of each dot size is acquired via the landed-dot shift characteristic storage unit 107. Specifically, information on the length of the axis in the x-direction and the length of the axis in the y-direction of each ellipse of the "ink sticking instable range" indicated by the dotted line and the "ink sticking range" indicated by the solid line in FIG. 7B described previously is acquired. In this case, in the landed-dot shift characteristic data for a large dot, information on $r\_xl$ and $r'\_xl$ indicating the length of the axis in the x-direction of the ellipse and $r\_yl$ and $r'\_yl$ indicating the length of the axis in the y-direction of the ellipse is included. Further, in the landed-dot shift characteristic data for a medium dot, information on $r\_xm$, $r'\_xm$, $r\_ym$, and $r'\_ym$ is included. Then, in the landed-dot shift characteristic data for a small dot, information on $r\_xs$, $r'\_xs$, $r\_ys$, and $r'\_ys$ is included.

Figures 9A, 9B, 9C, 9D, 9E:
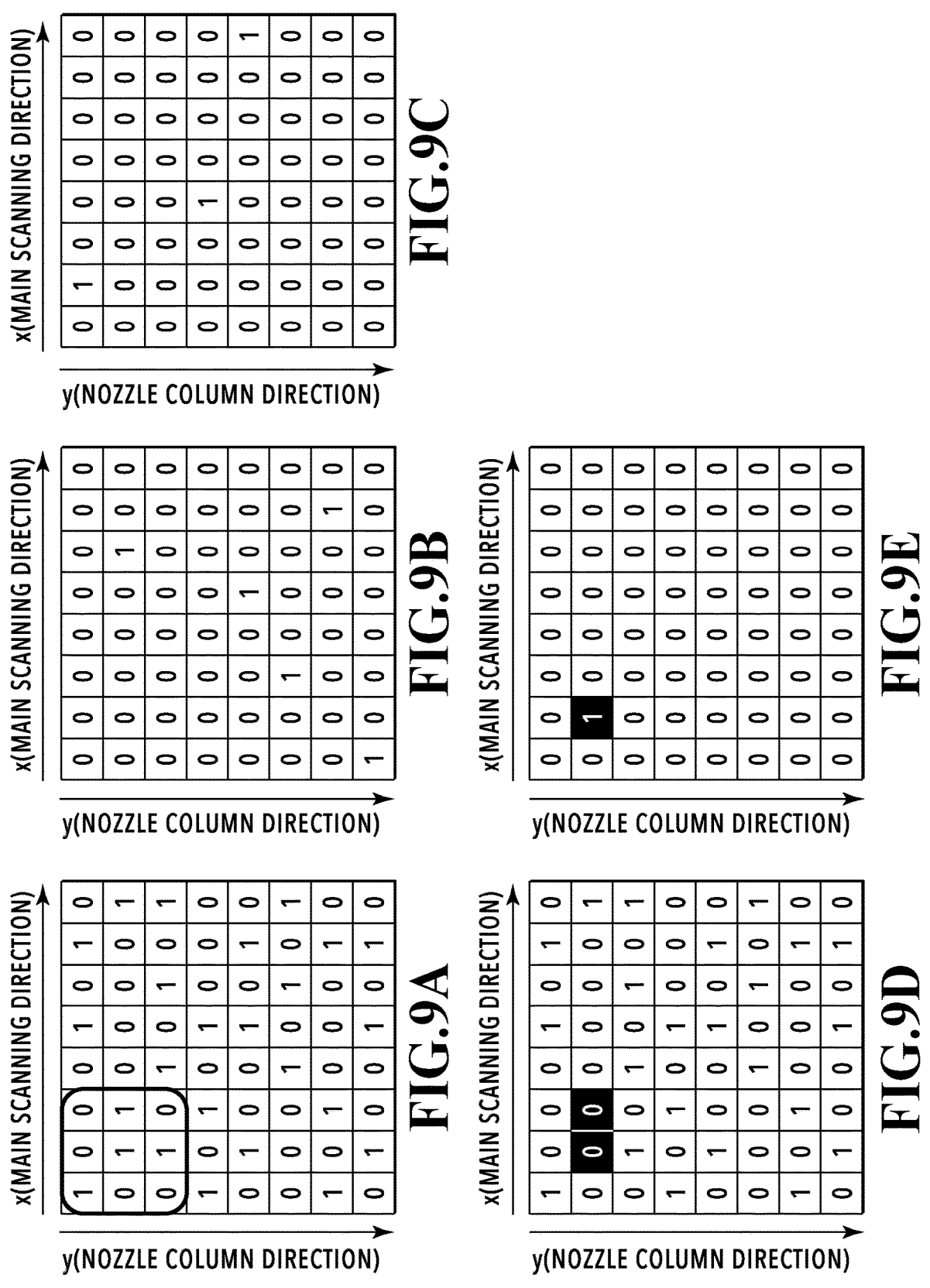

Next, at S802, binary image data corresponding to each dot size is acquired. In the present embodiment, as described previously, binary image data representing dot formation by on (1) and off (0) is acquired for each dot size of the three kinds of dot size, that is, large, medium, and small. FIG. 9A to FIG. 9C are each an example of a binary image for each dot size for the black ink. FIG. 9A corresponds to a small dot, FIG. 9B corresponds to a medium dot, and FIG. 9C corresponds to a large dot.

Next, at S803, from the binary image corresponding to small dots of the binary image of all the dot sizes acquired at S802, one dot pair which attention is focused on (hereinafter, described as "small dot pair of interest") is determined by, for example, referring to the list described previously. Here, explanation is given on the assumption that two small dots corresponding to position coordinates (x1, y1) and (x2, y2) at which "1" is stored in the binary image shown in FIG. 9A are determined as a small dot pair of interest. It is only required for a dot pair having a possibility that the dots contact each other to be described in the list that is referred to at this time and it may also be possible to exclude a dot pair for which it is clear that the dots do not contact each other (a pair whose distance between the centroids of the dots is sufficiently large, that is, a pair whose distance between the dots is longer than or equal to a predetermined distance). For example, in a case of a 600 dpi-printer and it is known that the maximum error is less than or equal to 20 μm, it is sufficient for pairs of two adjacent dots (dot formed in one of the eight upward, downward, leftward, rightward, left obliquely upward, left obliquely downward, right obliquely upward, and right obliquely downward directions of the reference dot) to be describe in the list. Here, attention is focused on the portion of 3×3 pixels enclosed by a thick frame in FIG. 9A described above. Here, in a case where the top-left position coordinates within the thick frame are taken to be (0, 0), there are four pairs whose dots are adjacent to each other within the thick frame as follows.

pair of two on-dots at position coordinates (0, 0) and (1, 1)

pair of two on-dots at position coordinates (1, 1) and (1, 2)

pair of two on-dots at position coordinates (1, 1) and (2, 1)

pair of two on-dots at position coordinates (1, 2) and (2, 1)

Regarding the above-described thick frame portion, it is sufficient for these four dot pairs to be described in the list. For example, it may also be possible to include the pair of the two on-dots at the position coordinates (0, 0) and (1, 2) in the list, but by excluding the pair, it is possible to suppress the data amount of the list.

In place of the method of determining a dot pair of interest by referring to the list, it may also be possible to determine a dot pair of interest by the following method. First, from the top left of the binary image toward the bottom right, a scan is performed until a dot position not processed yet and at which "1" is stored is found and a dot position (x1, y1) that is found is selected first. Then, a san is further performed and a dot position (x2, y2) whose distance from the already-selected dot position (x1, y1) is the shortest and at which "1" is stored is selected. Then, the two dots corresponding to the two dot positions (x1, y1) and (x2, y2) thus selected may be determined as a small dot pair of interest.

Next, at S804, whether or not there is a possibility that the contact stage of the two small dots configuring the small dot pair of interest determined at S803 changes is determined. At this time, based on the landed-dot shift characteristic data acquired at S801, the dot landing predicted range of the two dots of the small dot pair of interest is found and from the shift amount and the shift direction of the ink landing position, the presence/absence of a possibility that the contact state of both dots changes is determined. Specifically, first, the position coordinates (x1, y1) and (x2, y2) of the two dots configuring the small dot pair are set as ejection targets. Then, in a case where the results of ejecting ink droplets toward the set ejection targets, respectively, are as shown in FIG. 6A, that is, in a case where the "ink sticking instable ranges" overlap and the "ink sticking ranges" do not overlap, it is determined that there is a possibility that the contact state of the dots changes.

Figures 10A, 10B:
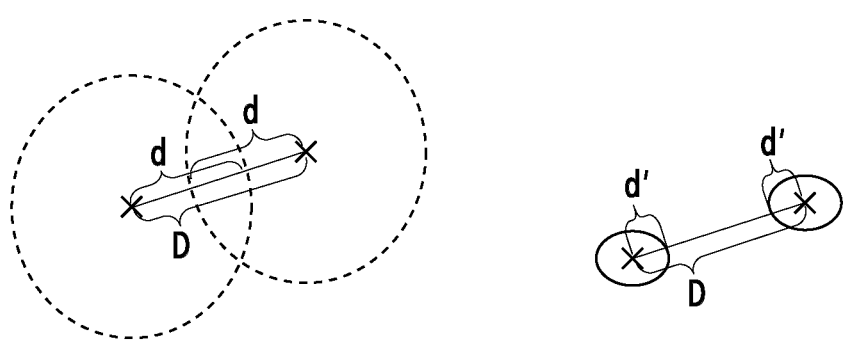
FIG. 10A is a diagram explaining an overlap of ink sticking unstable ranges and FIG. 10B is a diagram explaining a non-overlap of ink sticking ranges.

As for the overlap of the "ink sticking instable ranges", as shown in FIG. 10A, a distance D between the ejection targets and a distance d from the ejection target to the dotted line indicating the "ink sticking instable range" are found and in a case where $d \times 2 \geq D$, it is determined that the "ink sticking instable ranges" overlap. Similarly, as for the non-overlap of the "ink sticking ranges", as shown in FIG. 10B, the distance D between the ejection targets and a distance d' from the ejection target to the solid line indicating the "ink sticking range" are found and in a case where $d' \times 2 \geq D$, it is determined that the "ink sticking ranges" do not overlap. Summarizing the above, in a case where $2d \geq D$ and $2d' < D$, it is determined that there is a possibility that the contact state of the two small dots configuring the small dot pair of interest changes. It is possible to calculate the distance D by equation (2) below and the distance d (d') by equation (3) below, respectively.

$$D = \sqrt{(X2-X1)^2 + (Y2-Y1)^2} \quad \text{equation (2)}$$

$$d = \frac{r\_ys\sqrt{(X2-X1)^2 + (Y2-Y1)^2}}{(X2-X1)\sqrt{\frac{r\_ys^2}{r\_xs^2} + \frac{(Y2-Y1)^2}{(X2-X1)^2}}} \quad \text{equation (3)}$$

In equations (2) and (3) described above, X1, Y1, X2, and Y2 each represent an ink landing position [μm] on a printing medium, which are calculated form the position coordinates (x1, y1) and (x2, y2) of the two dots configuring the small dot pair of interest. Further, in equation (3) described above, r_xs and r_ys each represent the landed-dot shift characteristic. In equation (3) described above, it is assumed that X2>X1 in principle and in a case where X2=X1, d is taken to be r_ys (d=r_ys).

In a case where it is determined that there is a possibility that the contact state of dots changes by the above-described processing, the processing advances to S805. On the other hand, in a case where it is determined that there is not a possibility that the contact state of dots changes, the processing skips S805 and advances to S806.

At S805, processing to replace the two dots of the small dot pair of interest with one medium dot one size larger. Specifically, first, the values "1" at the dot positions (x1, y1) and (x2, y2) of the small dot pair of interest in the binary image of small dots are rewritten by "0". Then, one of the corresponding dot positions (x1, y1) and (x2, y2) in the binary image of medium dots is selected randomly and the value "0" at the selected dot position is rewritten by "1". Here, by taking the portion enclosed by the thick frame in FIG. 9A described previously as an example, specific explanation is given. Here, it is assumed that a possibility of the change of the contact state is determined to exist for the small dot pair of interest whose dot positions are (1, 1) and (2, 1) at S804. In this case, first, the two dots configuring the dot pair are deleted from the binary image of small dots shown in FIG. 9A (the values at the coordinate positions (1, 1) and (2, 1) are changed from "1" to "0"). FIG. 9D shows the binary image of small dots after the change and the portion indicated by solid-white characters is the changed portion and it is known that the two dots are changed from on-dots to off-dots. Then, one on-dot is added to the corresponding coordinate position in the binary image of medium dots shown in FIG. 9B (the value at the coordinate position (1, 1) is changed from "0" to "1"). The position to which the on-dot is added may be any position as long as it corresponds to the dot positions of the small dot pair of interest and the on-dot may be added to the coordinate position (2, 1) in place of the coordinate position (1, 1). FIG. 9E shows the binary image of medium dots after the change and the portion indicated by the solid-white character is the changed portion, and it is known that one on-dot is added. At this time, the ejection amount is set in advance so that the ink ejection amount corresponding to two small dots and the ink ejection amount corresponding to one medium dot substantially coincide with each other (or so that the density on a printing medium is substantially the same). Due to this, it is possible to suppress a change in density by the dot replacement processing.

In a case where the processing to replace the small dot pair of interest with a medium dot is completed, at S806, whether or not each piece of processing at S803 to S805 is completed for all the small dots (or, for all the combinations of small dots having a possibility that the contact state changes) is determined. In a case where the processing for all the small dots (or, all the combinations of small dots having a possibility that the contact state changes) is completed, the processing advances to S807 and in a case where the processing is not completed yet, the processing returns to S803, and the next small dot pair is determined and the processing is continued.

By the steps so far, it is possible to replace the combination of two small dots whose contact state is likely to change with one medium dot. In the processing at S807 and subsequent steps also, processing to replace a combination of two medium dots whose contact state is likely to change with one large dot is performed similarly.

First, at S807, in the binary image data corresponding to the second smallest dot size of the binary image data of all the dot sizes acquired at S802, one dot pair which attention is focused on is determined. There are three kinds of dot size, that is, large, medium, and small in the present embodiment, and therefore, one dot pair of interest in the binary image data corresponding to medium dots is determined. Then, at S808 that follows, as in the case with S804, whether or not there is a possibility that the contact state of the two medium dots configuring the medium dot pair which attention is focused on (hereinafter, described as "medium dot pair of interest") determined at S807 is determined. In a case where results of determination indicate that there is a possibility that the contact state changes, the processing advance to S809 and in a case where it is determined that there is not a possibility that the contact state changes, the processing skips S809 and advances to S810.

At S809, by the same method as that at S805, processing to replace the two medium dots of the medium dot pair of interest with one large dot one size larger. At this time, by setting in advance the ejection amount so that the ejection amount corresponding to two medium dots and the ejection amount corresponding to one large dot substantially coincide with each other (or so that the density on a printing medium is substantially the same), it is possible to suppress a change in density by the replacement processing.

In a case where the dot replacement processing for the medium dot pair of interest is completed, at S810, as in the case with S806, whether or not each piece of processing at S807 to S809 is completed for all the medium dots (or, for all the combinations of medium dots having a possibility that the contact state changes) is determined. In a case where the processing for all the medium dots (or, all the combinations of medium dots having a possibility that the contact state changes) is completed, the dot rearrangement processing is terminated and in a case where the processing is not completed yet, the processing returns to S807, and the next medium dot pair is determined and the processing is continued.

The above is the contents of the dot rearrangement processing according to the present embodiment. The binary image of each of large dots, medium dots, and small dots for each ink color obtained by the dot rearrangement processing such as this is output as print image data. In a case of the present embodiment in which printing is performed by using four kinds of ink of CMYK, 12 pieces of 1-channel image data represented by one bit, which indicates on/off of each of C large, C medium, C small, M large, . . . , and K small are output. Alternatively, it may also be possible to output four pieces of 1-channel image data represented by two bits, which represents the ink ejection amount by 00=off dot, 01=small dot, 10=medium dot, and 11=large dot for each of CMYK.

In the explanation described above, the presence/absence of a possibility of the change of the contact state of dots is determined in the real-number space, such as the lengths in the x-direction and the y-direction of the ellipse (see FIG. 7B), but for example, it may also be possible to perform the determination in a space quantized to a resolution sufficiently higher than the HT resolution. Alternatively, it may also be possible to store in advance, as a table, results of determination of whether or not the contact state changes for a combination of a difference $\Delta x=x2-x1$ in the x-direction and a difference $\Delta y=y2-y1$ in the y-direction, which are calculated from the ink landing positions (x1, y1) and (x2, y2). In such a case, at S804 and S808, it is possible to determine whether not the contact state changes by a landed-dot shift by calculating $\Delta x$ and $\Delta y$ and referring to the table. Further, it may also be possible to determine whether or not the contact state changes by a landed-dot shift by finding in advance combinations of $\Delta x$ and $\Delta y$ for which the contact state changes and storing the combinations as a list and by referring to the list at S804 and S808.

(Generation Method of Landed-Dot Shift Characteristic Data)

Next, a generation method of landed-dot shift characteristic data that is referred to in the dot rearrangement processing is explained. As described previously, the landed-dot shift characteristic is information capable of specifying a range having a sufficiently faint possibility that the color material (ink) sticks thereto, a range having a sufficiently strong possibility of that, and a range having both possibilities of that and in the embodiment, information specified by the lengths of the axes in the x-direction and the y-direction of the ellipse as shown in FIG. 7B. In the following, with reference to FIG. 11A and FIG. 11B, how to obtain the lengths $r\_x$ and $r'\_x$ of the axis in the x-direction and the lengths $r\_y$ and $r'\_y$ of the axis in the y-direction of the ellipse as the landed-dot shift characteristic is explained.

Figure 11A:
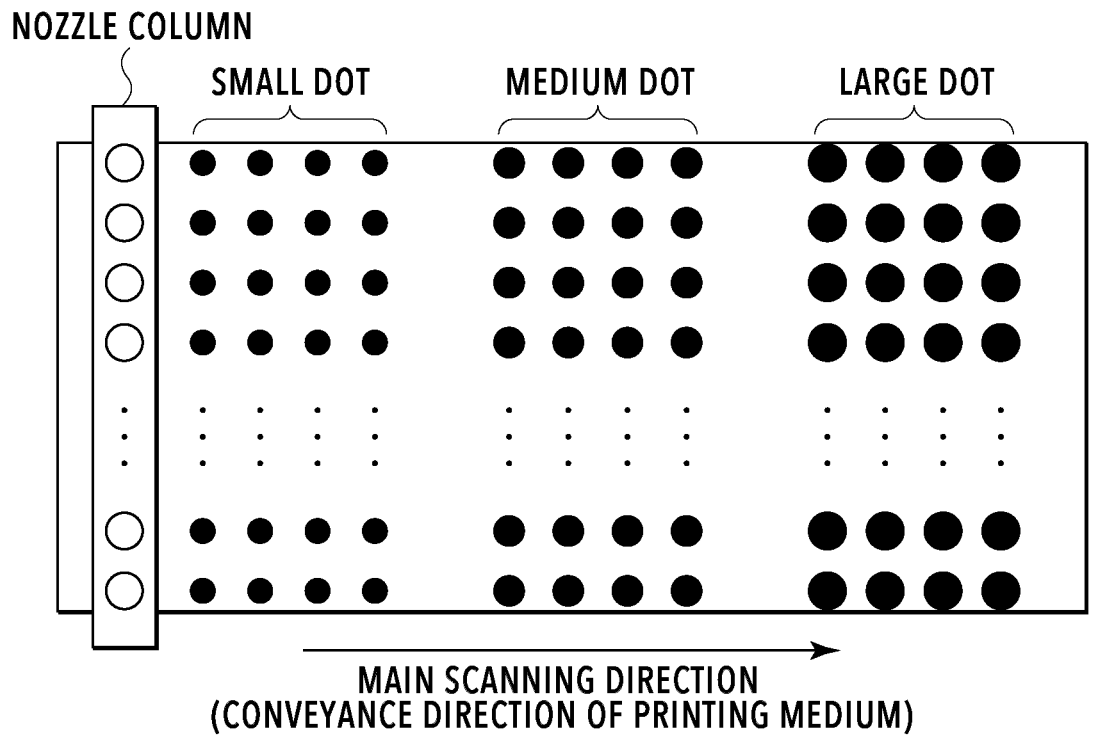
FIG. 11A is a diagram showing an example of a test chart.
Figure 11B:
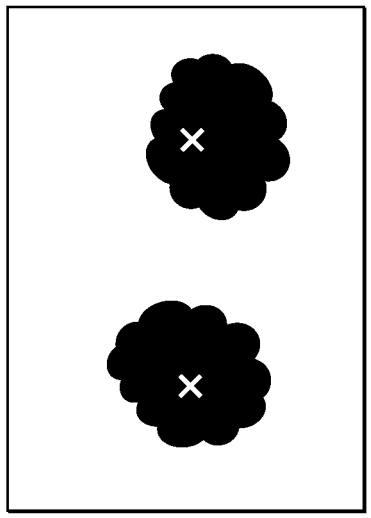
FIG. 11B is an enlarged diagram of a part of a scanned image.
Figure 11C:
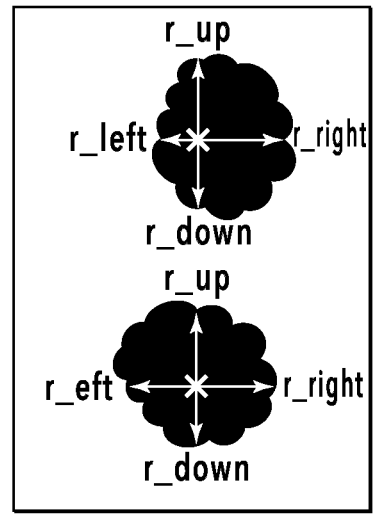
FIG. 11C is a diagram explaining a measurement method of a distance from an ink landing target position.

FIG. 11A is an example of a test chart for obtaining the lengths of the axes in the x-direction and the y-direction of the ellipse. In the test chart shown in FIG. 11A, each dot is arranged so that four large dots, four medium dots, and four small dots are ejected from each nozzle and formed sufficiently apart from one another (ink droplets are ejected). First, the test chart shown in FIG. 11A is printed and the printed test chart is read by a scanner apparatus, not shown schematically, and thus a scanned image is obtained. FIG. 11B is an enlarged diagram of a part of the obtained scanned image. From the scanned image thus obtained, the area to which ink sticks is extracted and the distance from the ink landing target position is measured for the extracted area. Specifically, as shown in FIG. 11C, distances $r\_left$ and $r\_right$ in the horizontal direction between the ink landing target position and the boarders of the area to which ink sticks are measured for each nozzle. Similarly, distances $r\_up$ and $r\_down$ in the vertical direction are measured for each nozzle. Then, the maximum value of the measured $r\_left$ and $r\_right$ for each nozzle is taken as $r\_x$ and the minimum value is taken as $r'\_x$. Similarly, the maximum value of the measured $r\_up$ and $r\_down$ for each nozzle is taken as $r\_y$ and the minimum value is taken as $r'\_y$.

The method of obtaining the lengths $r\_x$ and $r'\_x$ of the axis in the x-direction and the lengths $r\_y$ and $r'\_y$ of the axis in the y-direction of the ellipse is not limited to the above-described method. For example, it may also be possible to calculate and find the variation amount of the average dot size and the centroid position from the scanned image of the test chart described above. Further, in the above-described explanation, the maximum amount of the shift is used as the landed-dot shift characteristic, but this is not limited. For example, the value of $3\sigma$ may be taken as the landed-dot shift characteristic in a case where it is assumed that the shift amount is a regular distribution and the variance amount at this time is taken as $\sigma$. Further, in a case where the nozzle column corresponding to each color of CMYK has a landed-dot shift characteristic different from one another, it is preferable to generate and use landed-dot shift characteristic data for each nozzle column. Further, it may also be possible to generate and use landed-dot shift characteristic data different for each nozzle configuring the nozzle column. For example, in a case of the nozzle column configuration shown in FIG. 4 described previously, the end of the nozzle column is more susceptible to the airflow and there is a tendency for the landed-dot shift to become large. In the case such as this, it is possible to more effectively suppress the deterioration of the feeling of granularity and the occurrence of streaks due to a landed-dot shift by generating and using landed-dot shift characteristic data in units of nozzles.

<Modification Example>

In the present embodiment, two relatively small dots are replaced with one relatively large dot. However, the dot replacement ratio is not limited to this. For example, it is also possible to replace three relatively small dots having a possibility that the contact state changes with two relatively large dots. In this case, by causing the total ink ejection amount of three relatively small dots to substantially coincide with the total ink ejection amount of two relatively large dots (or by adjusting the ink ejection amounts so that the densities substantially coincide with each other), it is possible to suppress a change in density by replacement.

Further, at S805 and S809 described above, one relatively large dot is arranged at the position selected randomly from the dots positions (x1, y1) and (x2, y2) of the two removal-target relatively small dots. However, the position at which a relatively large dot is placed may be, for example, combined centroid position of two relatively small dots to be removed by replacement (or position closest to the combined centroid position).

Alternatively, it may also be possible to store the number of ink droplets (number of dots) to be ejected for each nozzle and arrange dots so that the numbers of dots become as equal as possible. In this case, for example, it is sufficient to select a nozzle whose number of dots is smaller from the nozzle corresponding to y1 and the nozzle corresponding to y2. By determining the dot position based on the number of dots for each nozzle, it is possible to suppress the variation of the number of times of ejection for each nozzle and it is made possible to prolong the life of the print head. Further, it is made possible to suppress the degradation of image quality (occurrence of streaks, deterioration of the feeling of granularity, and the like) caused by the variation of the used nozzle. In a case where the dot position is determined based on the number of dots of each nozzle, it may also be possible to determine the dot position based on only the number of relatively large dots, or based on the total number of all large, medium, and small dots.

Alternatively, it may also be possible to find the density of dots by performing filtering processing for the dot arrangement after relatively small dots are removed and arrange a dot at a position where the dot density is lowest. By arranging a dot in this manner, compared to a case where a dot is arranged randomly, the dispersity of a dot pattern improves and it is possible to suppress the deterioration of the feeling of granularity.

Alternatively, it may also be possible to refer to the ink value image data and arrange a dot at a position whose value is larger on the ink value image data in the dot arrangement after relatively small dots are removed. By arranging a dot in this manner, the responsiveness to an input signal improves and the reproduction of a high-frequency signal, such as reproduction of an edge, becomes favorable.

In a case where a binary dot pattern is generated by the ordered dither method in the HT processing unit 105, it may also be possible to arrange a relatively large dot at a position where the threshold value of the threshold value matrix is the smallest of the dot positions of the removed dots. That is, in a case where the threshold values of the threshold value matrix are set so that the binary image data becomes a highly dispersed pattern, a dot is arranged preferentially at a position where the threshold value is small. By doing so, compared to a case where a dot is arranged randomly, the dispersity of the pattern after replacement improves and it is possible to suppress the deterioration of the feeling of granularity. Alternatively, it may also be possible to arrange a relatively large dot at a position where the difference between the threshold value matrix and the input value is the largest of the dot positions of the removed dots. By arranging a dot in this manner, it is possible to implement improvement to the reproduction of a high-frequency signal and the suppression of deterioration of the feeling of granularity described previously.

Alternatively, it may also be possible to find a change rate of the contact state at each dot position from the binary image and the landed-dot shift characteristic of a relatively large dot and arrange a relatively large dot at a dot position where the contact state is most unlikely to change.

As above, according to the present embodiment, it is possible to generate a dot pattern whose degradation of image quality, such as the deterioration of the feeling of granularity and the occurrence of density unevenness and streaks due to a landed-dot shift, is unlikely to occur by more effectively suppressing a change in the overlap of ink droplets on a printing medium.

Second Embodiment

In the first embodiment, in a case where a plurality of relatively small dots having a possibility that the contact state of dots changes due to a landed-dot shift is replaced with one one-size larger dot, the change of the contact state is determined only for a dot pair of the same size. Because of this, it is not possible to suppress the change of the contact state, which occurs between dots of different sizes, and therefore, a concern remains that it is not possible to suppress the deterioration of the feeling of granularity and the occurrence of density unevenness and streaks. Consequently, an aspect is explained as a second embodiment, in which also in a case where there is a possibility that the contact state of dots of different dot sizes changes, those dots are replaced en bloc with a larger dot. Explanation of the contents in common to those of the first embodiment, such as the basic configuration of the image forming system, is omitted and in the following, the processing in the dot rearrangement processing unit 106, which is a different point, is explained mainly.

Figure 12:
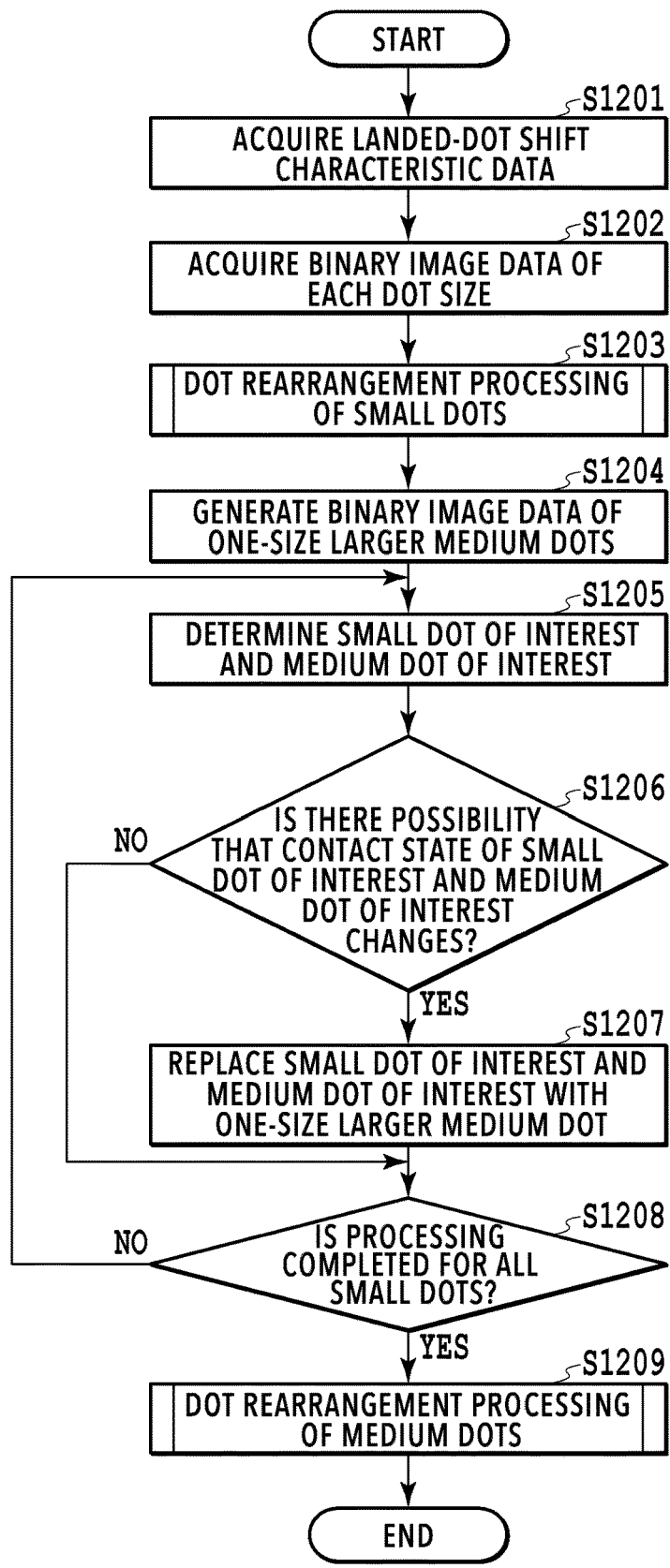
FIG. 12 is a flowchart showing a flow of dot rearrangement processing according to a second embodiment.

FIG. 12 is a flowchart showing a flow of the dot rearrangement processing according to the present embodiment. In the present embodiment, it is premised that three kinds of dot size, that is, large, medium, and small dot sizes, are used as in the first embodiment. Then, in a case where there is a possibility that the contact state of a small dot and a medium dot changes due to a landed-dot shift, the small dot and the medium dot are replaced en bloc with a dot whose size is larger than the medium dot (hereinafter, described as "one-size larger medium dot"). At the time of performing the replacement, by causing the ejection amount of the one-size larger medium dot to be equal to the total of the ejection amount of the one small dot and the ejection amount of the one medium dot, it is possible to suppress the density variation due to replacement processing. In the following, explanation is given along the flow in FIG. 12.

First, at S1201, as in the case with S801 described previously in the flow in FIG. 8 of the first embodiment, the landed-dot shift characteristic data of each of the large, medium, and small dot sizes is acquired via the landed-dot shift characteristic storage unit 107. At S1202 that follows, as in the case with S802 described previously, the binary image data corresponding to each dot size is acquired.

Next, at S1203, the dot rearrangement processing of small dots to replace a small dot pair having a possibility that the contact state of dots changes due to a landed-dot shift with one medium dot, that is, each step of S803 to S806 described previously is performed.

At S1204 to S1208 that follow, processing to replace a pair of a small dot and a medium dot having a possibility that the contact state changes due to a landed-dot shift with one one-size larger medium dot, which is the feature of the present embodiment, is performed.

At S1204, the binary image data of one-size larger medium dots, in which "0" is set as the initial value of each pixel, is generated. The format (image size and resolution) of the binary image of one-size larger medium dots, which is generated here, is the same as the format of the binary image of each of the large, medium, and small dot sizes, which is acquired at S1202.

At S1205 that follows, one small dot of interest and one medium dot of interest are determined from each of the binary images corresponding to small dots and medium dots of the binary image of all the dot sizes acquired at S1202. At the time of this determination, it is sufficient to, first, take a dot selected randomly from among unprocessed dots in the binary image of small dots as a small dot of interest and next, select a medium dot located at the position closest to the small dot of interest from the binary image of medium dots, and so on.

Next, at S1206, based on the ejection target position of each of the small dot of interest and the medium dot of interest determined at S1205 and the landed-dot shift characteristic data acquired at S1201, whether or not there is a possibility that the contact state of both dots of interest changes is determined. Specifically, as in the case with S804 and S808 described previously, in a case where the "ink sticking ranges" of both dots of interest do not overlap and the "ink sticking instable ranges" overlap, it is determined that there is a possibility that the contact state changes. In a case where results of determination indicate that there is a possibility that the contact state of both dots of interest changes, the processing advances to S1207 and in a case where there is not such a possibility, the processing skips S1207 and advances to S1208.

At S1207, processing to replace the small dot of interest and the medium dot of interest determined at S1205 with one one-size larger medium dot is performed. Specifically, it is sufficient to set the value of the pixel closest to the centroid position of the small dot of interest and the medium dot of interest in the binary image corresponding to the one-size larger medium dot generated at S1204 to "1".

In a case where the dot replacement processing to the one-size larger medium dot is completed, at S1208, whether or not each piece of processing at S1204 to S1207 is completed for all the small dots (or, for all the combinations of small dots having a possibility that the contact state changes) is determined. In a case where the processing for all the small dots (or, all the combinations of small dots having a possibility that the contact state changes) is completed, the processing advances to S807 and in a case where the processing is not completed yet, the processing returns to S1205, and the next small dot pair is determined and the processing is continued. By performing the above-described processing for all the small dots, it is possible to replace a pair of a small dot and a medium dot having a possibility that the contact state changes due to a landed-dot shift with one one-size larger medium dot.

Next, at S1209, the dot rearrangement processing of medium dots to replace a pair of medium dots having a possibility that the contact state changes due to a landed-dot shift with one large dot, that is each step of S807 to S810 described previously is performed.

The above is the contents of the dot rearrangement processing according to the present embodiment. By performing the processing such as this, a pair of a small dot and a medium dot having a possibility that the contact state changes is replaced with one one-size larger medium dot. Due to this, it is possible to suppress the occurrence of streaks and density unevenness and the deterioration of the feeling of granularity resulting from the change of the contact state of a small dot and a medium dot.

<Modification Example>

The flow in FIG. 12 described above terminates at the time of the completion of the dot rearrangement processing of medium dots (S1209), but this is not limited. For example, it may also be possible to perform a step of replacing a pair of a medium dot and a one-size large medium dot having possibility that the contact state changes due to a landed-dot shift with one one-size larger large dot as S1210 following S1209. By doing so, it is possible to suppress the change of the contact state of a medium dot and a one-size larger medium dot. Further, at the time of performing the replacement, by causing the ejection amount of one one-size larger large dot to be equal to the total of the ejection amount of one medium dot and the ejection amount of one one-size larger medium dot, it is possible to suppress the density variation due to the replacement processing.

Further, it may also be possible to perform processing to replace a small dot and a large dot with a one-size larger large dot based on the possibility that the contact state changes as S1211 following S1210 described above. By doing so, it is possible to suppress the change of the contact state of a small dot and a large dot. At this time, in a case where the ejection amount of a one-size larger medium dot substantially coincides with the total of the ejection amounts of a medium dot and a small dot, and the total of the ejection amounts of one medium dot and one one-size larger medium dot substantially coincides with the ejection amount of a one-size larger large dot, the total of the ejection amounts of a small dot and a large dot substantially coincides with the ejection amount of a one-size larger large dot. By making a design in this manner, the density variation due to the replacement processing from a small dot and a large dot to a one-size larger large dot is suppressed.

Further, in the present embodiment, a small dot and a medium dot having a possibility that the contact state changes are replaced with a one-size larger medium dot, but the method of suppressing the change of the contact state, which occurs between dots of different sizes, is not limited to this. For example, in a case where there is a small dot whose contact state does not change around the medium dot of interest, it may also be possible to change the position of the small dot of interest to the position of the small dot whose contact state does not change. Alternatively, it may also be possible to change to the position of a small dot whose possibility that the contact state changes is the faintest. Similarly, in place of the processing to replace a small dot and a large dot with a one-size larger large dot based on the change of the contact state, it may also be possible to change the position of the small dot of interest to the position of a small dot whose contact state does not change in a case where there is a small dot whose contact state does not change around the large dot of interest. Alternatively, it may also be possible to change to the position of a small dot whose possibility that the contact state changes is the faintest. In a case of this method, it is not necessary to generate new dots, such as a one-size larger medium dot and a one-size larger large dot.

Third Embodiment

In the first and second embodiments, the dot rearrangement processing to replace a plurality of dots having a possibility that the contact state changes due to a landed-dot shift en bloc with one dot is performed. Then, by causing the ejection amounts to be substantially equal before and after the dot replacement, an attempt is made to suppress the density variation due to dot rearrangement. However, the ink ejection amount is under restrictions by a design of granularity and color separation, a design of head drive, or the like, and therefore, there is a case where it is difficult to cause the ejection amounts to be substantially equal before and after dot replacement. Consequently, an aspect is explained as a third embodiment in which suppression of density variation due to dot rearrangement processing is implemented by stochastically changing the size of a dot after replacement based on ejection amounts before and after dot replacement. Explanation of the contents in common to those of the first and second embodiments is omitted and in the following, processing in the dot rearrangement processing unit 106, which is a different point, is explained mainly.

Figure 13:
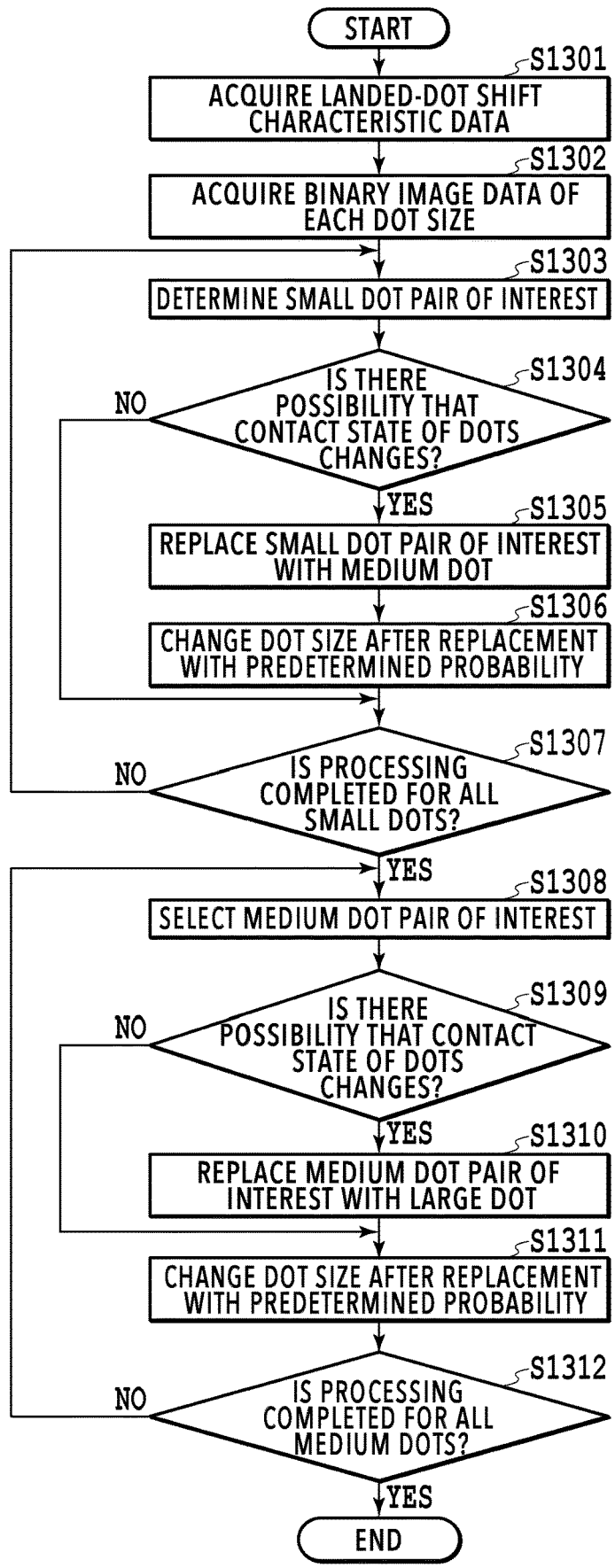
FIG. 13 is a flowchart showing a flow of dot rearrangement processing according to a third embodiment.

FIG. 13 is a flowchart showing a flow of the dot rearrangement processing according to the present embodiment. In the present embodiment also, it is premised that three kinds of dot size, that is, large, medium, and small sizes, are used as in the first and second embodiments.

S1301 to S1305 correspond to S801 to S805 in the flow in FIG. 8 of the first embodiment and there is not a difference in particular, and therefore, detailed explanation is omitted. In a case where it is determined that there is a possibility that the contact state of two small dots configuring a small dot pair of interest changes (Yes at S1304) and the two dots are replaced with one medium dot (S1305), the processing advances to S1306.

At S1306, the size of the medium dot after the replacement is changed with a probability p based on ejection amounts before and after the dot replacement processing at S1305. That is, the dot size is changed so that the expected value of the ejection amount per unit area does not change before and after the dot replacement. Specifically, as follows. Here, it is assumed that the ejection amount of a small dot is represented by 1_small, the ejection amount of a medium dot by 1_medium, and the ejection amount of a large dot by 1_large, respectively.

First, in a case where $2 \times 1\_small \geq 1\_medium$, with the probability $p=(2 \times 1\_small-1\_medium)/(1\_large-1\_medium)$, the medium dot after the replacement is changed to a large dot. For example, it is assumed that the ejection amount of a small dot is 2 [pl], the ejection amount of a medium dot is 3 [pl], and the ejection amount of a large dot is 5 [pl]. At this time, the probability $p=(2 \times 2-3)/(5-3)=½$ results. That is, with a probability of ½, the medium dot arranged at S1305 is changed to a small dot.

Further, in a case where $2 \times 1\_small<1\_medium$, with the probability $p=(1\_medium-2 \times 1\_small)/(1\_medium-1\_small)$, the medium dot after the replacement is changed to a small dot. For example, it is assumed that the ejection amount of a small dot is 2 [pl] and the ejection amount of a medium dot is 5 [pl]. At this time, $p=(5-2 \times 2)/(5-2)=\frac{1}{3}$ results. That is, with a probability of ⅓, the medium dot arranged at S1305 is changed to a small dot.

As described above, by stochastically changing the dot size after the replacement, the expected value of the ejection amount per unit area does not change before and after the dot replacement processing and it is possible to suppress a change in density in the dot rearrangement processing. Further, it is also possible to perform the processing at S1305 and S1306 en bloc. That is, it may also be possible to determine the size of the dot to be replaced based on the probability p based on the ejection amounts before and after the dot replacement. Specifically, in a case where $2 \times 1\_small \geq 1\_medium$, with the probability $p=(2 \times 1\_small-1\_medium)/(1\ large-1\_medium)$, two small dots are replaced with one large dot. Alternatively, it is sufficient to replace two small dots with one medium dot by with a probability of (1−p). On the other hand, in a case where $2 \times 1\_small<1\_medium$, with the probability $p=(1\_medium-2 \times 1\_small)/(1\_medium-1\_small)$, two small dots are replaced with one small dot. Alternatively, it is sufficient to replace two small dots with one medium dot with a probability of (1−p).

In a case where the dot replacement for the small dot pair of interest and the size change processing for the dot after the replacement under a predetermined condition are completed, at S1307, whether or not each piece of processing at S1303 to S1306 is completed for all the small dots (or, for all the combinations of small dots having a possibility that the contact state changes) is determined. In a case where the processing for all the small dots is completed, the processing advances to S1308. On the other hand, in a case where there remains an unprocessed small dot, the processing returns to step S1303, and the next small dot pair is determined and the processing is continued.

At the steps so far, the processing to replace two small dots whose contact state is likely to change with one medium dot and the size change processing for the medium dot after the replacement are performed. Similarly at S1308 to S1312 that follow, the processing to replace two medium dots whose contact state is likely to change and the size change processing for the large dot after the replacement are performed.

In a case where it is determined that there is a possibility that the contact state of two medium dots configuring a medium dot pair of interest changes (Yes at S1310) and the two medium dots are replaced with one large dot (S1310), the processing advances to S1311.

At S1311, the size of the large dot after the replacement is changed with the probability p based on the ejection amounts before and after the dot replacement processing at S1310. That is, as in the case with S1306 described previously, the dot size is changed so that the expected value of the ejection amount per unit area does not change before and after the dot replacement. Specifically, as follows. Here, it is also assumed that the ejection amount of a small dot is represented by 1_small, the ejection amount of a medium dot by 1_medium, and the ejection amount of a large dot by 1_large, respectively.

First, like the size change of a medium dot after the replacement, there is a method of changing a large dot after the replacement with a medium dot with the probability $p=(1\_large-2 \times 1\_medium)/(1\_large-1\_medium)$ in a case where $2 \times 1\_medium \leq 1$ large.

Next, in a case where $2 \times 1\_medium<1\_large$ and it is possible for the print head 201 to eject a dot (hereinafter, described as "one-size larger large dot") whose ejection amount is larger than that of a large dot, it may also be possible to change a large dot after the replacement with a one-size larger large dot. That is, in a case where the ejection amount of a one-size larger large dot is taken to be 1_large', a large dot after the replacement is changed to a one-size larger large dot with the probability $p=(2 \times 1\_medium-1\_large)/(1\_large'-1\_large)$.

Further, in a case where the print head 201 is not compatible with a one-size larger large dot, or the like, it may also be possible to prevent the expected value of the ejection amount per unit area from changing by changing the size of a dot around the large dot after the replacement or on/off of the ejection. For example, there is a method of changing a medium dot existing at the position closest to the large dot added anew at S1310 with a large dot with the probability $p=(2 \times 1\_medium-1\_large)/(1\_medium)$. In this case, provided that the ejection amount of a small dot is 2 [pl], the ejection amount of a medium dot is 3 [pl], and the ejection amount of a large dot is 5 [pl], the medium dot closest to the large dot after the replacement is changed to a large dot with the probability $p=(2 \times 1\_medium-1\_large)/(1\_large-1\_medium)=(2 \times 3-5)/(5-3)=½$. Alternatively, it may also be possible to change the small dot existing at the position closest to the large dot after the replacement to a medium dot with the probability $p=(2 \times 1\_medium-1\_large)/(1\_medium-1\_small)=(2 \times 3-5)/(3-2)=1$. Further, it may also be possible to change the size of a dot selected randomly from dots around the large dot after the replacement, in place of the dot closest to the large dot after the replacement. Alternatively, it may also be possible to select a dot whose possibility that the contact state changes is the faintest in a case where the dot size is changed.

Further, in place of changing the size of the large dot after the replacement, it may also be possible to add a small dot anew with the probability $p=(2 \times 1\_medium-1\_large)/1\_small=(2 \times 3-5)/2=½$. At this time, it is preferable to add a dot to be added at a position at which a possibility that the contact state changes is the faintest within a predetermined range.

In a case where the dot replacement processing for the medium dot pair of interest is completed, at S1312, as in the case with S810, whether or not each piece of processing at S1308 to S1311 is completed for all the medium dots (or for all the combinations of medium dots having a possibility that the contact state changes) is determined. In a case where the processing for all the medium dots is completed, the dot rearrangement processing is terminated. On the other hand, in a case where there remains an unprocessed medium dot, the processing returns to S1308, and the next medium dot pair is determined and the processing is continued.

The above is the contents of the dot rearrangement processing according to the present embodiment.

Fourth Embodiment

In the third embodiment, the aspect is explained in which the dot size after the replacement is changed so that the expected value of the ejection amount per unit area does not change before and after the dot replacement processing. However, in a case where the change of the dot size is controlled with a probability, there is a possibility that it is not possible to control a change in density as intended or a possibility that the granularity deteriorates unintentionally due to the dot size change. Consequently, an aspect is explained as a fourth embodiment in which a characteristic of a change in density that occurs in a case where ink value image data of a uniform color (having an even pixel value) is input is measured in advance and the ink value image data is corrected based on the characteristic of a change in density. In this case, it is not possible to suppress a change in density that occurs in a high-frequency area, but a change in density in a high-frequency area is unlikely to be perceived originally by the human eyes as degradation of image quality. That is, in the present embodiment, by suppressing a change in density in an area of a uniform color (low-frequency area) that is likely to be perceived by the human eyes, a change in density in the dot replacement processing is made unlikely to be perceived without relying on control with a probability.

Figure 14:
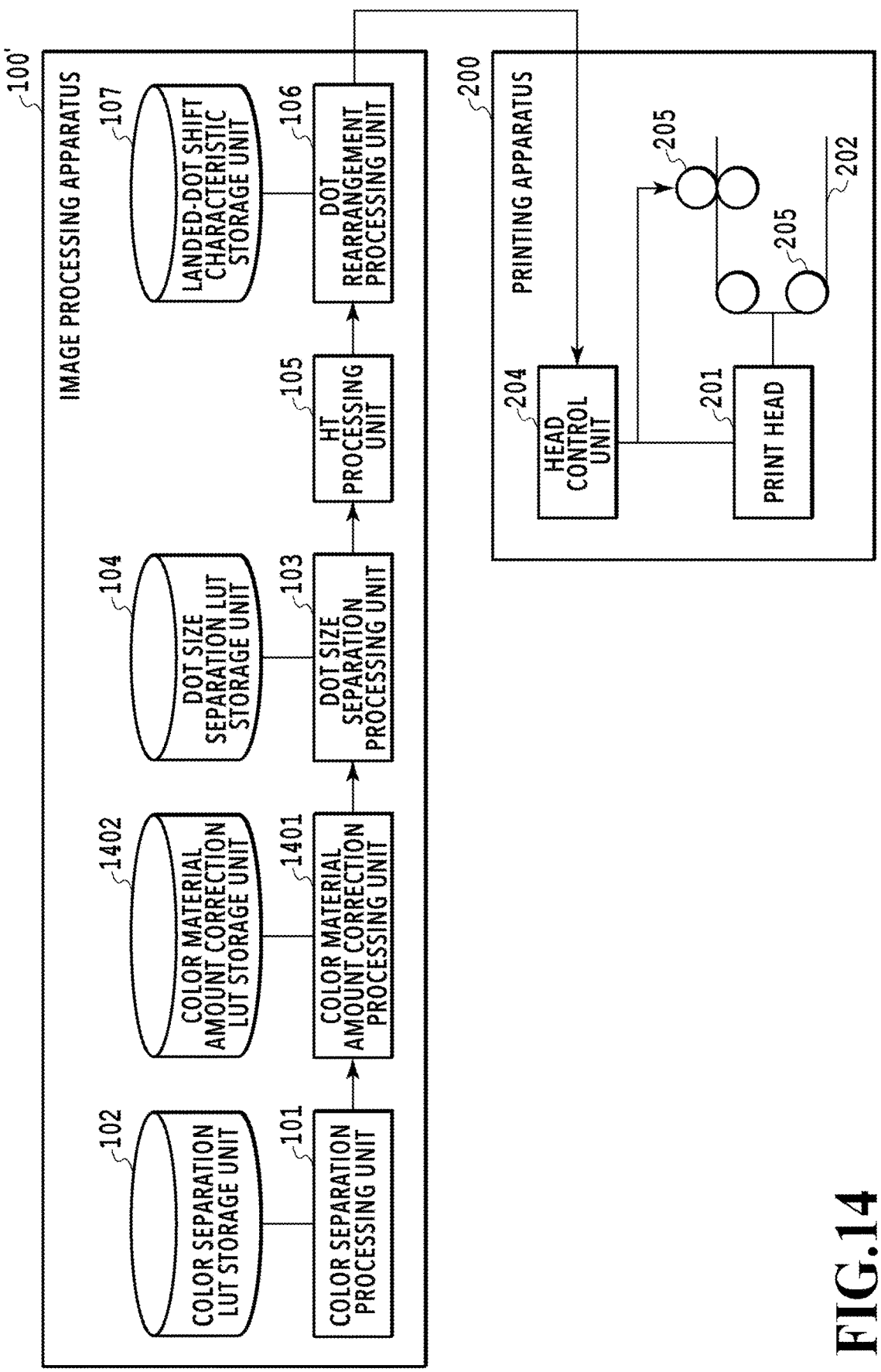
FIG. 14 is a block diagram showing an example of a configuration of an image forming system according to a fourth embodiment.

FIG. 14 is a block diagram showing an example of the configuration of the image forming system according to the present embodiment. The basic configuration of the image forming system shown in FIG. 14 is the same as that in FIG. 1 described previously and includes an image processing apparatus 100' and the printing apparatus 200. However, the image processing apparatus 100' of the present embodiment includes a color material amount correction processing unit 1401 and a color material amount correction LUT storage unit 1402, in addition to the configuration of the image processing apparatus 100 in FIG. 1.

The color material amount correction processing unit 1401 performs processing to correct the value of the color material amount (ink amount) so as to cancel a change in density that may occur due to the dot replacement processing in the dot rearrangement processing unit 106 for the ink value image data of CMYK separated in the color separation processing unit 101. In this color material amount correction processing, a color material amount correction LUT stored by the color material amount correction LUT storage unit 1402 is used. FIG. 15 shows an example of the color material amount correction LUT for performing correction so that a desired density is obtained even in a case where the dot rearrangement processing is performed. In a case of the LUT shown in FIG. 15, for example, on a condition that the pixel value at position coordinates (x, y) of the ink value image data is "127", the pixel value after the correction is "117". In the following, correction of an ink value using the color material amount correction LUT is explained specifically by using FIG. 16A to FIG. 16C.

Figure 16A:
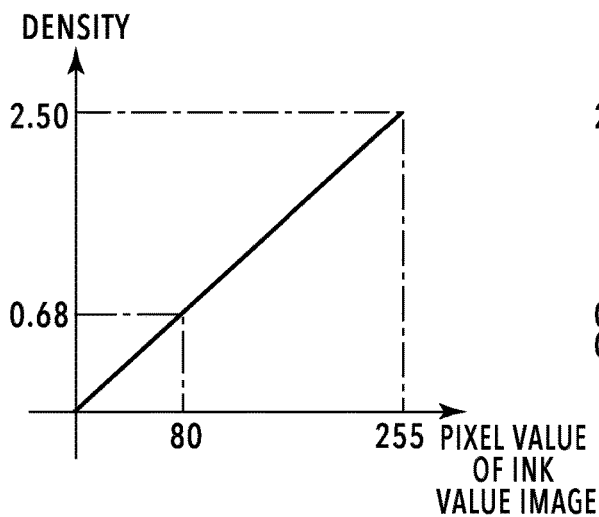
FIG. 16A to FIG. 16C are diagrams explaining color material amount correction processing.
Figure 16B:
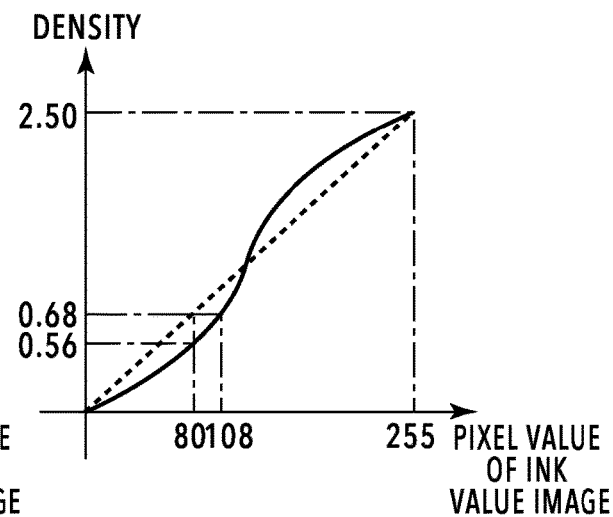
Figure 16C:
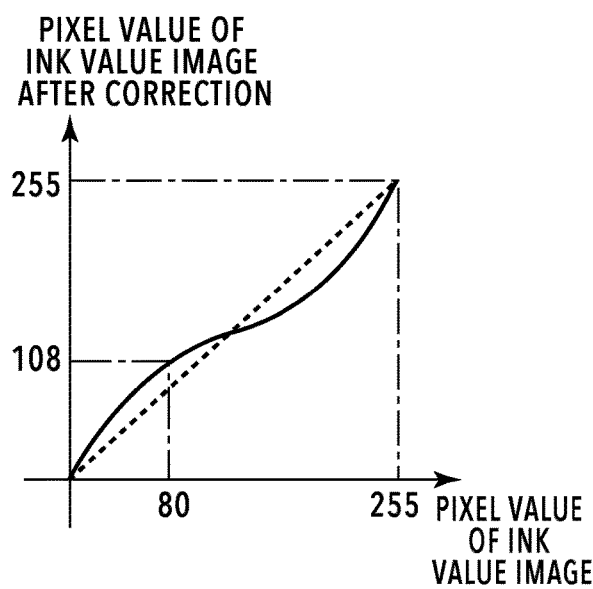

FIG. 16A shows a relationship between the pixel value and the optical density in an ink value image in a case where dot rearrangement processing is not performed. In the present embodiment, it is assumed that a color separation LUT is designed so that the ink value image is linear for the density. FIG. 16B shows a relationship between the pixel value and the optical density in the ink value image in a case where the dot rearrangement processing is performed. In the present embodiment, in a case where dots having a probability that the contact state changes are replaced, the ejection amounts before and after the replacement are not caused to be substantially equal, and therefore, the linearity between the pixel value and the density in the ink value image is lost due to the dot rearrangement processing. It is possible to obtain the relationship between the pixel value and the optical density in the ink value image shown in FIG. 16B by measuring the density of an image of a uniform color output by the printing apparatus 200. In detail, it is sufficient to perform ejection amount separation processing, HT processing, and dot rearrangement processing for the ink value image data of a plurality of uniform colors whose pixel values are different and measuring the density of the output material thereof by a colorimeter (not shown schematically). FIG. 16C shows an example of the characteristic of the color material amount correction LUT. It is possible to obtain the color material amount correction LUT having the characteristic in FIG. 16C as follows based on FIG. 16B.

First, a linear correspondence relationship indicated by a dotted line in FIG. 16B is specified so that the maximum value of the pixel value and the maximum value of the optical density of the ink value image correspond to each other. Here, a linear correspondence relationship (density=2.5×pixel value of the ink value image/255) is specified so that the pixel value="255" and the value of the optical density="2.5" in the ink value image correspond to each other. Next, for each pixel value in the ink value image data, the pixel value in the ink value image data is reversely found from the corresponding linear density. For example, the density in a case where the dot pattern after the dot rearrangement is output for a pixel value of "80" is "0.56" from FIG. 16B. On the other hand, from FIG. 16A, according to the linear relationship between the pixel value and the density, the original output density in a case of a pixel value of "80" is "0.68". That is, in the characteristic shown in FIG. 16B, it is known that the output density for the pixel value "80" drops due to the dot rearrangement processing. Then, in the characteristic shown in FIG. 16B, a pixel value whose linear density is "0.68" is reversely found and a pixel value of "108" of the ink value image after the correction is obtained. In this manner, in a case where the pixel value is, for example, "80" in the ink value image data after the dot rearrangement processing, by correcting the pixel value to "108", it is made possible to obtain the desirable linear density "0.68".

As described above, from the density specified linearly, the pixel value in the ink value image is reversely found based on the relationship between the pixel value and the optical density in the ink value image shown in FIG. 16B, and thereby, it is possible to obtain the color material amount correction LUT of the characteristic shown in FIG. 16C. Then, by specifying the characteristic of the color material amount correction LUT by the method such as this, it is possible to make the relationship between the pixel value and the density in the ink value image after the correction the same as the linear relationship in FIG. 16A.

It may also be possible to create and store an LUT that combines the color material amount correction LUT and the dot size separation LUT stored by the dot size separation LUT storage unit 104 described previously so that the processing is completed by one-time processing integrating the color material amount correction processing and the dot size separation processing. Further, the color material amount correction LUT shown in FIG. 15 is an LUT in which an 8-bit output value is made to correspond to an 8-bit input value, but for example, it may also be possible to use an LUT in which a 12-bit output value is made to correspond to an 8-bit input value.

Fifth Embodiment

Figure 17:
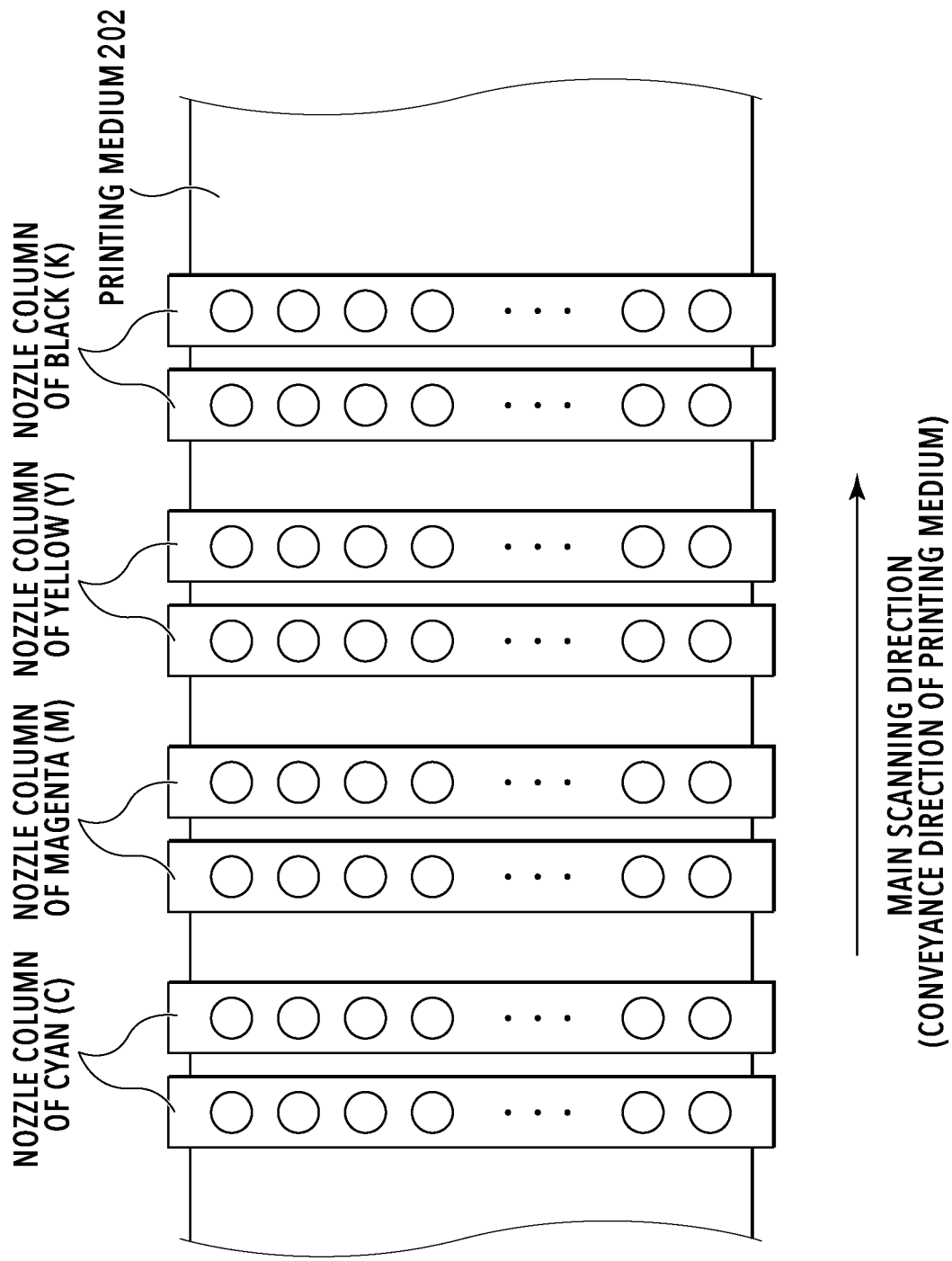
FIG. 17 is a diagram showing a configuration of a print head in a multi-column printing method.

In the first to fourth embodiments, explanation is given on the premise that the print head has the configuration (see FIG. 4) including one nozzle column corresponding to each ink of CMYK. Next, an application example to a so-called multi-column head printing method in which the print head includes a plurality of nozzle columns ejecting the same color ink is explained as a fifth embodiment. FIG. 17 is a diagram showing the configuration of the print head including two nozzle columns for each color, which is used in the multi-column head printing method. In this case, it is only required for each nozzle column to print a half each time in the conveyance direction, and therefore, it is possible to double the conveyance speed of the printing medium 202 compared to a case of one nozzle column for each of CMYK.

Incidentally, with the configuration of the print head adopting the multi-column printing method as shown in FIG. 17, there is a case where the influence of the landed-dot shift between the nozzle columns is predominant over the influence of the landed-dot shift within the same nozzle column. That is, there is a case where the landed-dot shift that occurs for each nozzle column resulting from an inclination at the time of attachment of the nozzle columns, the variation of the conveyance speed of the printing medium 202, and the like, is so large that it is possible to ignore the landed-dot shift between dots ejected from the same nozzle, such as a displacement in the ink ejection direction. In the case such as this, it is sufficient to preferentially suppress the landed-dot shift between the nozzle columns first and then select one dot each time from each of the different nozzle columns and take them as a dot pair of interest. Specifically, one dot that is landed at the same position coordinates (or adjacent position coordinates) is selected each time from each of the different nozzle columns ejecting the same color and a dot pair of interest is determined. Then, in a case where there is possibility that the contact state of the dots configuring the dot pair of interest changes due to a landed-dot shift that occurs for each nozzle column, it is sufficient to replace those dots en bloc with one large dot. By performing the dot rearrangement processing as described above, it is possible to effectively suppress streaks, unevenness, and the feeling of granularity resulting from the contact state changing due to a landed-dot shift between nozzle columns.

It may also be possible to check the change of the contact state of dots based on a landed-dot shift within a nozzle column as needed and then perform dot replacement after performing dot replacement based on a landed-dot shift between nozzle columns.

Further, in a case where the attachment accuracy of nozzle columns and the conveyance accuracy of the printing medium 202 are sufficiently high and the distance between the nozzle columns of the same color is sufficiently great, there is a possibility that the change of the contact state of dots to be ejected within the same nozzle column is the main cause of degradation of image quality rather than a landed-dot shift between nozzle columns. In such a case, it may also be possible to preferentially suppress a landed-dot shift within a nozzle column. That is, it may also be possible to select a dot pair of interest from a dot group to be ejected from the same nozzle column and in a case where there is a possibility that the contact state of the dots configuring the dot pair of interest changes, then replace the dots en bloc with one dot. After this, it may also be possible to perform dot replacement based on a landed-dot shift between nozzle columns as needed.

Six Embodiment

In the first to fifth embodiments, explanation is given on the premise that the printing apparatus 200 is a full line method ink jet printing apparatus. That is, in the embodiments so far, as shown in FIG. 4 or FIG. 17, by using a print head including nozzle columns having a length covering the width of a printing medium, an image is formed by causing the print head to relatively scan the printing medium.

Next, an application example in a case where the printing apparatus 200 is a multi-pass method ink jet printing apparatus is explained as a sixth embodiment. Here, the multi-pass method is a method in which an image is formed by repeatedly performing an operation to cause a print head to relatively perform a main scan for a printing medium and to convey the printing medium by a conveyance amount less than or equal to the length of the nozzle column in a sub scanning direction substantially perpendicular to the main scanning direction. FIG. 18A to FIG. 18C are diagrams explaining a two-pass printing operation to print an image by the print head performing a scan twice on the same line. As shown in FIG. 18A to FIG. 18C, in a case of the two-pass printing, for example, an image corresponding to a width of L of the print head 201 is printed in a main scan by a carriage and each time printing of one line is completed, the printing medium 202 is conveyed by a distance of L/2 each time in the sub scanning direction. For example, an area A is printed by the mth main scan (FIG. 18A) and the (m+1)th main scan (FIG. 18B) of the print head 201 and an area B is printed by the (m+1)th main scan (FIG. 18B) and the (m+2)th main scan (FIG. 18C). Similarly, in a case where n-pass printing is performed, for example, each time printing of one line is completed, the printing medium 202 is conveyed by a distance of L/n each time in the sub scanning direction. In this case, an image is formed by the print head 201 performing a main scan n times on the same line of the printing medium 202.

In the multi-pas printing method described above, there is a case where a landed-dot shift that occurs between passes is predominant over a landed-dot shift that occurs within the same pass. In the multi-pass method, to the same position on the same line, ink is ejected from a plurality of different nozzles. Because of this, in a case where the number of passes is increased to a sufficiently large number, the directions and amounts of landed-dot shifts are dispersed on the same line, and therefore, the landed-dot shift is unlikely to be recognized visually as streaks or unevenness. On the other hand, in a case where an image is printed by a plurality of times of pass, the scan position shifts between passes due to the conveyance error of the printing medium 202, and therefore, the possibility that the contact state of dots in the dot pair of the ink ejected by different passes changes is strong. In the case such as this, it is sufficient to give priority to the landed-dot shift between passes first and then determine a dot pair of interest by selecting dots from a dot group formed by different passes. Specifically, dots landed at the same position coordinates (or adjacent position coordinates) are selected one by one from each dot group formed by different passes and those dots are determined as a dot pair of interest. Then, in a case where there is a possibility that the contact state of the dots configuring the dot pair of interest changes, the dot pair of interest is replaced en bloc with one large dot. By performing the dot rearrangement processing as described above, it is possible to effectively suppress streaks, unevenness, and the feeling of granularity resulting from the contact state of dots changing due to a shift in the scan position between passes.

It may also be possible to check the possibility of the change of the contact state of dots due to a landed-dot shift within the same pass as needed and then perform dot replacement processing after performing dot replacement based on a landed-dot shift between passes. Further, in a case where the conveyance accuracy of the printing medium 202 is sufficiently high and the wetting spread of ink forming a dot is large, there is a possibility that the change of the contact state of the dots in the dot pair of ink to be ejected in the same pass is the main cause of degradation of image quality rather than a landed-dot shift between passes. In such a case, it may also be possible to give priority to a landed-dot shift within a pass. That is, it is sufficient to determine a dot pair of interest by selecting dots from a dot group ejected in the same pass. Then, in a case where there is a possibility that the contact state of the dots configuring the dot pair of interest changes, the dot pair of interest is replaced en block with a one large dot. After this, it may also be possible to perform dot replacement processing based on a landed-dot shift between passes as needed.

In the example of the multi-pass method shown in FIG. 18A to FIG. 18C, the main scanning direction is described as from left to right on the drawing. However, in order to reduce the printing processing time, there is a multi-pass method by a reciprocating scan in which the main scans for the even number of times are performed in the opposite direction (in the above-descried example, from right to left). In a case where the reciprocating scan such as this is performed, the possibility that the shift in the scan position between the forward scan and the backward scan is predominant is strong. In this case, it is sufficient to give priority to a landed-dot shift between the forward scan and the backward scan and determine a dot pair of interest by selecting a dot from each of the dot group formed by the forward scan and the dot group formed by the backward scan. Then, in a case where there is a possibility that the contact state of the dots configuring the dot pair of interest changes, the dot pair of interest is replaced en block with one large dot. In particular, in a case where one dot lands by separating into a main dot and a satellite dot and the influence of the satellite dot is larger, the centroid position of the dot differs depending on the scanning direction, and therefore, it is preferable to select a dot pair by taking into consideration the satellite dot position.

By performing the dot rearrangement processing as described above, it is possible to effectively suppress streaks, unevenness, and the feeling of granularity resulting from the contact state of dots changing due to a shift in the scan position between the forward scan and the backward scan in the reciprocating scan in the multi-pass method.

Other Embodiments

In the first to sixth embodiments, a dot pair having a possibility that the contact state of dots changes is replaced with a one-size larger dot. However, the replacement method is not limited to the method described above and any replacement processing may be accepted as long as the number of dots after the replacement is less than or equal to the original number and the reproduced density is substantially the same. For example, there is a case where the print head can form only dots of the same size but has a configuration including nozzle columns ejecting a plurality of inks of the same hue (gray and black, cyan and light cyan). In the print head such as this, it may also be possible to replace a dot pair having a possibility that the contact state of dots changes with a higher-density dot of the same hue. Specifically, in a case where the print head 201 includes nozzle columns capable of ejecting GY (gray) ink, in addition to CMYK, it may also be possible to replace two GY dots having a possibility that the contact state changes with one K (black) dot.

Further, in the examples described above, the landed-dot shift characteristic is approximated as an ellipse (see FIG. 5). However, depending on the characteristic of the printing apparatus 200, there is a case where only the landed-dot shift in a specific direction is dominant for degradation of image quality. For example, in a case of a full line method ink jet printing apparatus, density unevenness in the form of streak that occurs particularly in the main scanning direction (conveyance direction of a printing medium) is likely to occur. The density unevenness in the form of streak that occurs at this time is caused mainly by the landed-dot shift in the nozzle column direction (direction perpendicular to the conveyance direction of a printing medium). Consequently, in the case such as this, it may also be possible to perform dot replacement processing by ignoring the landed-dot shift in the main scanning direction and predicting the change of the contact state between dots only by the landed-dot shift in the nozzle column direction. That is, it may also be possible approximate the landed-dot shift characteristic as a line in place of an ellipse. Specifically, it is sufficient to perform processing by taking the values of $r\_x$ and $r'\_x$ indicating the lengths of the axes in the x-direction of the ellipse as "0", respectively, in FIG. 7B described previously. Further, it may also be possible to perform dot replacement processing based on the landed-dot shift in the main scanning direction as needed after performing dot replacement processing by predicting the change of the contact state only by the landed-dot shift in the nozzle column direction. By performing the dot rearrangement processing as described above, it is possible to effectively suppress the density unevenness in the form of steak in a case of the full line method.

Further, in the examples described above, the information capable of specifying the "ink non-sticking range", the "ink sticking range", and the "ink sticking instable range" relating to the ink to be ejected from the print head is taken to be the landed-dot shift characteristic data. Then, in a case where the "ink sticking instable ranges" of the dots in the dot pair of interest overlap and the "ink sticking ranges" do not overlap, it is determined that there is a possibility that the contact state of the dots changes due to a landed-dot shift and the dot replacement processing is performed. However, depending on the characteristic of the printing apparatus 200, there is a case where the "ink sticking range" hardly exists because the landed-dot shift of a dot is large for the dot diameter formed on a printing medium. In the case such as this, it may also be possible to handle the "ink sticking instable range" as the landed-dot shift characteristic as a "range having a possibility that ink sticks" and determine the possibility that the contact state of dots changes by determining whether or not the ranges overlap. Specifically, it is sufficient to take the value of the radius r' of the true circle indicated by the solid line in FIG. 7A described previously or the values of $r'\_x$ and $r'\_y$ indicating the lengths of the axes of the ellipse in FIG. 7B as "0" at all times without measuring them. Alternatively, in a case where $2 \times d \geq D$ holds based on the distance D between the ejection targets and the distance d from the ejection target to the dotted line shown in FIG. 10A, it may also be possible to determine that the "ink sticking instable ranges" overlap and there is a possibility that the contact state of dots changes.

As described above, by determining the possibility that the contact state changes, it is possible to effectively perform dot replacement processing.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to generate a dot pattern that is unlikely to cause degradation of image quality, such as deterioration of a feeling of granularity and occurrence of density unevenness and streaks, by effectively suppressing the change of the contact state of ink droplets on a printing medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-163545, filed Aug. 31, 2018 which is hereby incorporated by reference wherein in its entirety.

What is claimed is:

1. An image processing apparatus for performing image formation by forming dots on a printing medium by ejecting ink, the image processing apparatus comprising:
   one or more processors;
   a memory including instructions stored thereon that, when executed by the one or more processors, cause the image processing apparatus to function as:
   an acquisition unit configured to acquire halftone image data representing a dot pattern of each of two or more kinds of dot different in density reproduction; and
   a dot rearrangement unit configured to change, in a case where there is a possibility that a contact state between dots changes due to a landed-dot shift of the ink in a plurality of specific dots on a condition that dots are formed in accordance with a dot pattern in the halftone image data, the dot pattern by replacing the plurality of specific dots with dots of another kind whose number is less than or equal to that of the plurality of specific dots.

2. The image processing apparatus according to claim 1, wherein the instructions, when executed by the one or more processors, further cause the image processing apparatus to function as:
   a storage unit configured to store landed-dot shift characteristic data indicating a shift amount for an ejection-target position of the ink for each of the two or more kinds of dot; and
   a specifying unit configured to specify the plurality of specific dots having a possibility that the contact state between dots changes based on a position of each dot indicated by a dot pattern in the halftone image data and the landed-dot shift characteristic data.

3. The image processing apparatus according to claim 2, wherein
   the specifying unit specifies the plurality of specific dots having a possibility that the contact state between dots changes by referring to a list describing combinations of a plurality of dots having a possibility that dots contact each other.

4. The image processing apparatus according to claim 3, wherein
   in the list, combinations of dots whose distance between dot centroids is greater than a predetermined distance are described.

5. The image processing apparatus according to claim 2, wherein
   the landed-dot shift characteristic data is information capable of specifying a range having a possibility that ink sticks to the printing medium in a case where the ink is ejected to the ejection-target position, and
   the specifying unit determines there is a possibility that the contact state between dots changes in a case where the ranges of each dot configuring the plurality of specific dots overlap.

6. The image processing apparatus according to claim 5, wherein
   the landed-dot shift characteristic data is information on lengths of a minor axis and a major axis in a case where the range is approximated as an ellipse.

7. The image processing apparatus according to claim 2, wherein
   the landed-dot shift characteristic data is information capable of specifying, in a case where ink is ejected to an ejection-target position, a first range to which the ink is expected to stick and a second range expected to have both a possibility that the ink sticks and a possibility that the ink does not stick, and
   the specifying unit determines that there is a possibility that the contact state between dots changes in a case where the second ranges overlap but the first ranges do not overlap.

8. The image processing apparatus according to claim 7, wherein
   the landed-dot shift characteristic data is information on lengths of minor axes and major axes in a case where the first and second ranges are approximated as ellipses.

9. The image processing apparatus according to claim 1, wherein the plurality of specific dots having a possibility that the contact state between dots changes is two or more dots whose reproduced density per dot is relatively low, and the dot rearrangement unit replaces the two or more dots with one dot whose reproduced density per dot is relatively high.

10. The image processing apparatus according to claim 1, wherein the plurality of specific dots having a possibility that the contact state between dots changes is two or more dots whose dot diameter on the printing medium is relatively small, and the dot rearrangement unit replaces the two or more dots with one dot whose dot diameter on the printing medium is relatively large.

11. The image processing apparatus according to claim 10, wherein the two or more dots whose dot diameter is relatively small have the same dot size on a printing apparatus.

12. The image processing apparatus according to claim 10, wherein the two or more dots whose dot diameter is relatively small have different dot sizes on the printing medium.

13. The image processing apparatus according to claim 1, wherein the dot rearrangement unit replaces the plurality of specific dots with the dots of another kind so that an expected value of density per unit area before dot replacement substantially coincides with that after dot replacement.

14. The image processing apparatus according to claim 1, wherein the dot rearrangement unit replaces the plurality of specific dots with the dots of another kind so that an ink amount to be ejected before dot replacement substantially coincides with that after dot replacement.

15. The image processing apparatus according to claim 14, wherein the dot rearrangement unit changes, after replacing the plurality of specific dots with the dots of another kind so that an ink amount to be ejected before dot replacement substantially coincides with that after dot replacement, a dot size after the replacement with a predetermined probability based on the ink amount to be ejected at the time of the replacement.

16. The image processing apparatus according to claim 15, wherein the predetermined probability is a probability with which an expected value of density per unit area substantially coincides with that before the replacement is performed.

17. The image processing apparatus according to claim 1, wherein the halftone image data is image data obtained by performing halftone processing for image data corresponding to ink used for the image formation, and the image data corresponding to the ink used for the image formation is image data for which correction has been performed so as to cancel a change in density that may occur by dot replacement in the dot rearrangement unit.

18. An image processing method of generating an image for performing image formation on a printing medium by ejecting ink to form dots, the image processing method comprising:

acquiring halftone image data representing a dot pattern of each of two or more kinds of dot different in density reproduction; and changing, in a case where there is a possibility that a contact state between dots changes due to a landed-dot shift of the ink in a plurality of specific dots on a condition that dots are formed in accordance with a dot pattern in the halftone image data, the dot pattern by replacing the plurality of specific dots with dots of another kind whose number is less than or equal to that of the plurality of specific dots.

19. A non-transitory computer readable storage medium storing a program for causing a computer to perform an image processing method of generating an image for performing image formation on a printing medium by ejecting ink to form dots, the image processing method comprising:

acquiring halftone image data representing a dot pattern of each of two or more kinds of dot different in density reproduction; and changing, in a case where there is a possibility that a contact state between dots changes due to a landed-dot shift of the ink in a plurality of specific dots on a condition that dots are formed in accordance with a dot pattern in the halftone image data, the dot pattern by replacing the plurality of specific dots with dots of another kind whose number is less than or equal to that of the plurality of specific dots.

* * * * *